US012203302B2

(12) United States Patent
Talpe

(10) Patent No.: US 12,203,302 B2
(45) Date of Patent: Jan. 21, 2025

(54) MAGNETIC LATCH FOR FASTENING A HINGED CLOSURE MEMBER TO A SUPPORT

(71) Applicant: LOCINOX, Waregem (BE)

(72) Inventor: Joseph Talpe, Heestert-Zwevegem (BE)

(73) Assignee: Locinox, Waregem (BE)

( * ) Notice: Subject to any disclaimer, the term of this patent is extended or adjusted under 35 U.S.C. 154(b) by 63 days.

(21) Appl. No.: 18/265,091

(22) PCT Filed: Dec. 3, 2021

(86) PCT No.: PCT/EP2021/084281

§ 371 (c)(1),
(2) Date: Jun. 2, 2023

(87) PCT Pub. No.: WO2022/117879

PCT Pub. Date: Jun. 9, 2022

(65) Prior Publication Data

US 2024/0026716 A1 Jan. 25, 2024

(30) Foreign Application Priority Data

Dec. 4, 2020 (EP) ..................................... 20211968

(51) Int. Cl.
*E05C 5/00* (2006.01)
*E05B 17/00* (2006.01)
(Continued)

(52) U.S. Cl.
CPC .............. *E05C 5/00* (2013.01); *E05B 17/007* (2013.01); *E05B 65/0007* (2013.01); *E05C 19/163* (2013.01); *E05C 2003/128* (2013.01)

(58) Field of Classification Search
CPC .. E05C 9/006; E05C 19/163; E05C 2003/128; E05B 17/007; E05B 65/0007
See application file for complete search history.

(56) References Cited

U.S. PATENT DOCUMENTS 2,195,542 A 4/1940 Shaffer et al.
4,434,635 A * 3/1984 Borgato .............. E05B 65/0811 292/201
(Continued)

FOREIGN PATENT DOCUMENTS

AU 2009/251007 A1 7/2011
AU 2013/206766 A1 1/2015
(Continued)

OTHER PUBLICATIONS

International Search Report and Written Opinion for corresponding PCT Application No. PCT/EP2021/084281, mailed Mar. 31, 2022 (11 sheets).

*Primary Examiner* — Mark A Williams
(74) *Attorney, Agent, or Firm* — Lewis Roca Rothgerber Christie LLP

(57) ABSTRACT

A magnetic latch for fastening a closure member to a support comprising a latch assembly and a keeper assembly. The latch assembly comprises: a frame (70); a latch bolt (14) moveable between a latching position and a retracted position along a horizontal direction; and a latch bolt operating mechanism configured to move the latch bolt from its latching position to its retracted position. The latch bolt moved into its latching position by magnetic attraction. The latch bolt operating mechanism comprises an operation lever (91) and a support lever (92) both of which have a first part pivotally connected to the frame and a second part connected to the latch bolt. The latch bolt is suspended by the operation lever and the support lever and is swingable between its latching position and its retracted position.

14 Claims, 26 Drawing Sheets

(51) Int. Cl.

| | |
|---|---|
| ***E05B 65/00*** | (2006.01) |
| ***E05C 19/16*** | (2006.01) |
| *E05C 3/12* | (2006.01) |

(56) References Cited

U.S. PATENT DOCUMENTS

| | | | | | |
|---|---|---|---|---|---|
| 5,029,912 | A * | 7/1991 | Gotanda | E05B 47/0046 | 292/144 |
| 6,079,238 | A * | 6/2000 | Hoffmann | E05B 47/0673 | 70/283 |
| 7,469,564 | B1 * | 12/2008 | Shaw | E05B 47/023 | 70/279.1 |
| 11,828,103 | B1 * | 11/2023 | Johnson | E05B 9/08 | |
| 2004/0061339 | A1 * | 4/2004 | Lemettinen | E05B 9/02 | 292/201 |
| 2005/0086981 | A1 * | 4/2005 | Talpe | E05B 47/0661 | 70/283 |
| 2005/0210938 | A1 * | 9/2005 | Doyle | E05C 19/163 | 70/276 |
| 2006/0103142 | A1 * | 5/2006 | Talpe | E05B 65/0014 | 292/164 |
| 2012/0119523 | A1 * | 5/2012 | Burdenko | E05B 63/122 | 29/592 |
| 2018/0371796 | A1 * | 12/2018 | Talpe | E05B 47/0002 | |
| 2022/0145663 | A1 * | 5/2022 | Talpe | E05C 1/006 | |
| 2022/0145678 | A1 * | 5/2022 | Talpe | E05C 3/22 | |

FOREIGN PATENT DOCUMENTS

| | | | |
|---|---|---|---|
| AU | 2014/203446 | A1 | 1/2016 |
| AU | 2016/201778 | A1 | 10/2017 |
| AU | 2018/256525 | A1 | 4/2020 |
| EP | 1 657 383 | B1 | 5/2006 |
| GB | 2 286 627 | A | 8/1995 |
| RU | 2 239 039 | C1 | 10/2004 |
| WO | WO 92/03631 | A1 | 3/1992 |
| WO | WO 03/067004 | A1 | 8/2003 |
| WO | WO 2014/127398 | A1 | 8/2014 |
| WO | WO 2014/127399 | A1 | 8/2014 |
| WO | WO 2014/127413 | A1 | 8/2014 |

* cited by examiner

Fig. 16A
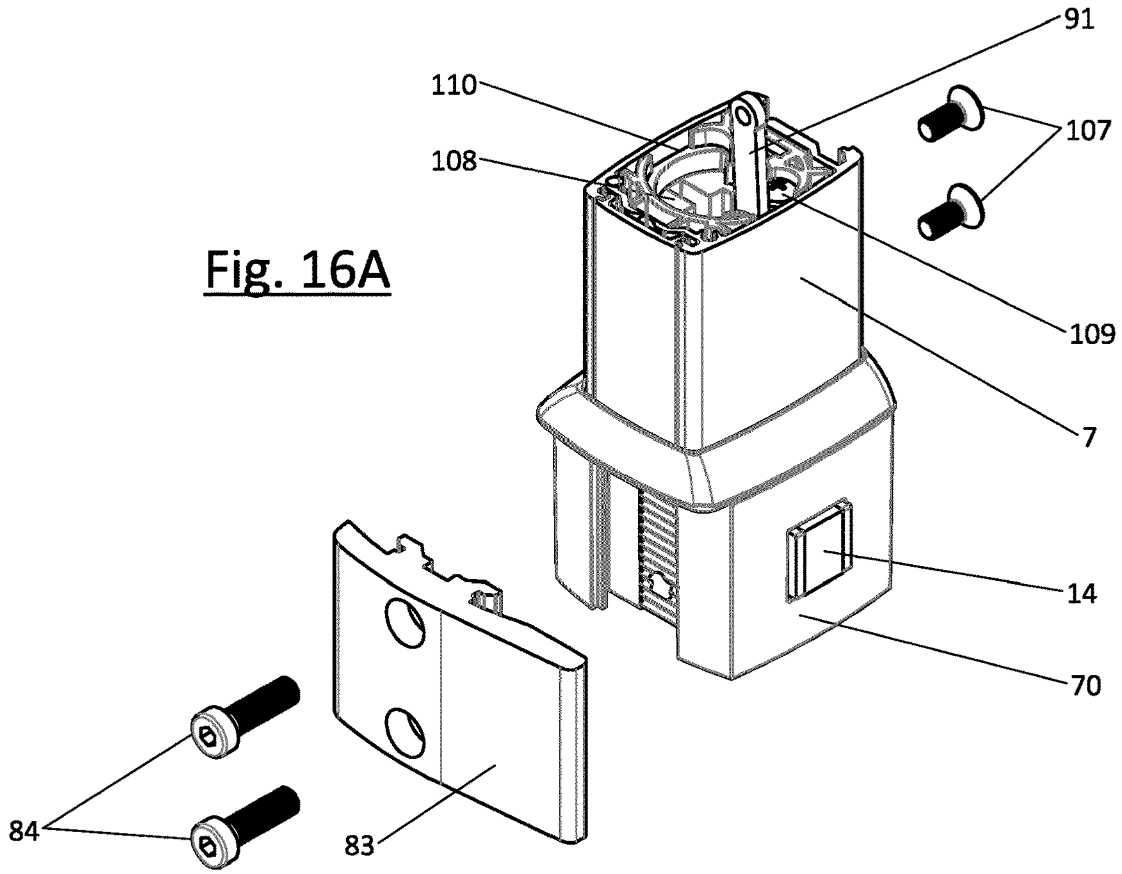
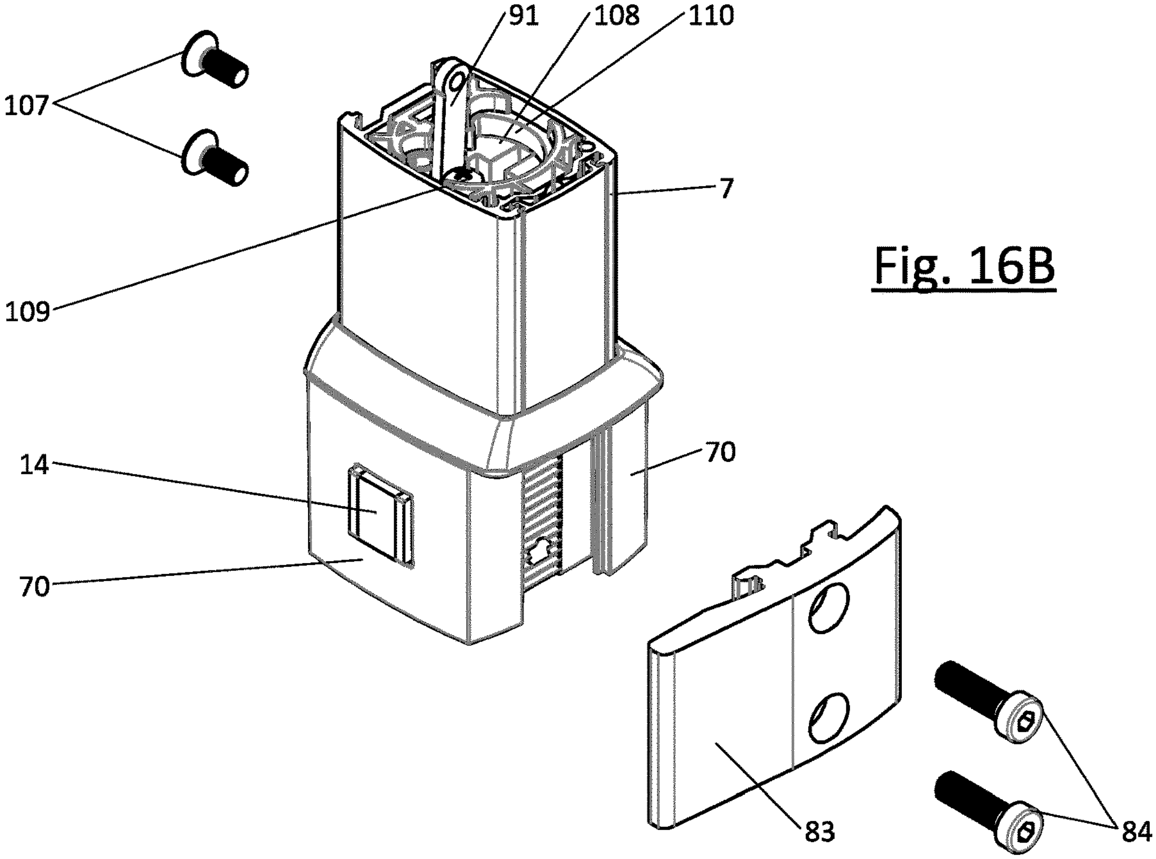
Fig. 16B

MAGNETIC LATCH FOR FASTENING A HINGED CLOSURE MEMBER TO A SUPPORT

CROSS-REFERENCE TO RELATED APPLICATIONS

This application is a National Phase patent application and claims priority to and the benefit of International Patent Application No. PCT/EP2021/084281, filed on Dec. 3, 2021, which claims priority to and the benefit of European Patent Application No. 20211968.1, filed on Dec. 4, 2020. The entire contents of both of which are incorporated herein by reference.

TECHNICAL FIELD

The present invention relates to a magnetic latch assembly for fastening a hinged closure member to a support.

BACKGROUND ART

A magnetic latch assembly comprises a latch bolt assembly configured to be mounted to one of the hinged closure member and the support and a magnet keeper assembly configured to be mounted to the other one of the hinged closure member and the support. The magnetic latch assembly can be mounted on various types of closure members, in particular a door or a gate. In several countries there are legal regulations for swimming pool gates. Most of these regulations specify a minimum height for the safety gates, a minimum height at which the actuator for opening the closure member are to be located, and/or required minimal and/or maximal force required to actuate the actuator. A common way to meet these requirements is by mounting the latch bolt assembly in an upright position on top of the gate with the actuator on the upper side of the latch bolt assembly. The actuator is typically a knob that has to be pulled upwards in order to open the closure member.

A first kind of known magnetic latch assembly for a hinged closure system comprises a latch bolt assembly and a magnet assembly. The magnet assembly is mounted on the fixed support of the closure system and the latch bolt assembly is mounted on the moveable closure member of the closure system. The latch bolt assembly comprises a horizontal latch bolt that is moveable between an latching position where it may engage the magnet assembly to fasten the closure member and a retracted position where it is retracted within the latch bolt assembly so that the closure member may be opened. A compression spring is disposed around the latch bolt in order to bias the latch bolt to the retracted position. The magnet assembly has a vertical housing with an actuation handle provided on top of the housing and a magnet being positioned near the bottom of the housing. The magnet is coupled to the actuation handle by an elongate bar. The magnet is moveable between an upper position where the magnet cannot sufficiently attract the latch bolt to pull its towards its latching position and a lower position where the magnet can engage the latch bolt to pull its towards its latching position. A compression spring is provided to urge the magnet towards its lower position. Pulling the actuation handle upwards in turn pulls the magnet towards its upper position against the force of the compression spring. When closing the closure member, the latch bolt is attracted by the magnet within the magnet assembly, which magnet is in its lower position, and is displaced to its latching position against the force of the compression spring thus engaging the magnet assembly and fastening the closure member. When actuating the handle, the magnet is moved to its upper position thus increasing the distance between the magnet and the latch bolt and decreasing the magnetic attraction so that the compression spring pulls the latch bolt to its retracted position to open the closure member.

Such assemblies are disclosed in AU 2009/251007 A1, AU 2013/206766 A1, 2014/203446 A1, AU 2016/201778 A1, and AU 2018/256525 A1.

AU 2013/206766 A1 further discloses that safety may be improved by having an actuation handle that may only be pulled upwards after a central area within the handle has been depressed. More specifically, depressing the central handle area causes a pawl to be horizontally displaced thereby allowing an upwards movement of the elongate bar. Additional safety measures are also disclosed in AU 2014/203446 A1 where the actuation handle requires a rotational motion followed by an upwards pulling motion in order to move the magnet towards its upper, i.e. disengaged, position.

A downside of such improved safety measures is that the opening requires a series of complicated motions which may be difficult for a user to execute.

AU 2016/201778 A1 and AU 2018/256525 A1 further disclose that the latch bolt assembly is provided with a key cylinder that may be used to lock the latch bolt. The main purpose of the key cylinder is to lock the latch bar in its latching position such that the closure member cannot be opened by the magnet assembly.

A downside of these locking mechanism is that the latch bolt mechanism is positioned quite low and may be in reach of children. Moreover, the locking mechanism is used to lock the latch bar in its latching position. This may pose a danger in case a user locks the locking mechanism while the gate is opened as this may prevent the latch bolt from entering the keeper and thus leave the gate unfastened.

General downsides of the first kind of magnetic latch assemblies is that the distance between the gate and the support is crucial. More specifically, the latch bolt and the magnet need to be very carefully aligned in order for the latch bolt to be attracted. As such, a careful height and width placement are required which is time consuming. Consequently, when the gate sags or otherwise moves somewhat, the distance between the permanent magnet and the latch bolt will become immediately so great that the magnetic attraction will no longer be able to attract the latch bolt against the tension of the compression spring and the gate will thus no longer be latched. A regular check-up and adjustment of the mutual position of the keeper assembly and of the latch bolt assembly is thus required.

Another downside is that the knob may be difficult to lift. More specifically, the force required to lift the knob in combination with the height at which the knob is positioned may make it difficult for a user (in particular a user of low height) to unfasten the closure member.

Another downside is that the magnet and the latch bolt are unlocked in a sideways fashion. More specifically, the magnet is pulled sideways with respect to the direction in which the latch bolt is attracted thereto. Such sideways motion typically requires a smaller force when compared to moving the latch bolt in the opposite direction of the magnetic attraction. This small force also means that the knob may be more easily lifted which may be a safety concern as children may be able to lift the knob.

A second kind of magnetic latch assembly for a hinged closure system comprises a magnet assembly mounted on the closure member and a latch bolt assembly mounted on the fixed post. The magnet assembly includes a striker that is fixed to the closure member and has a free end which partially extends beyond the closure member towards the support. The striker acts as a stop against the fixed post with a magnet being provided in the free end thereof. The latch bolt assembly includes a vertically oriented latch bolt moveable between an latching position and a retracted position with a compression spring urging the latch bolt to its retracted position and with the magnet pulling the latch bolt to its latching position to fasten the closure member. A pull knob is provided on the latch bolt assembly and is connected to the latch bolt via a link bar to allow the latch bolt to be pulled into its retracted position against the force of the magnet to open the closure member. A key cylinder is provided on the latch bolt assembly to allow to lock the latch bolt in its latching position. More specifically, the key cylinder is positioned besides the link bar and rotation of the cylinder causes the cylinder to interlock with a groove provided in the link bar.

Such assemblies are disclosed in WO 92/03631 A1, WO 03/067004 A1, US 2005/210938 A1, WO 2014/127413 A1, WO 2014/127398 A1, and WO 2014/127399 A1.

WO 03/067004 A1 additionally discloses a second operating mechanism which is separate from the pull knob and its associated key cylinder. The second operating mechanism is positioned at a lower height and includes a front and/or a rear push button, each of which allows to open the closure member. At least the front push button (i.e. the side of the closure member on the outside of the gated area) is provided with a key cylinder, keypad or the like that prevents operating the push button when locked. In order to allow various actuation mechanism to operate together, a multi-component latch arm is disclosed. The latch arm includes a lower link with a mounting plate at the bottom. The compression spring engages the mounting plate on one end and the latch bolt at the other end. The latch arm also includes an upper link that is slideably engaged with the lower link. Depressing either push button or pulling the knob at the top causes the upper link to move upwards thereby pulling the lower link upwards causing the latch bolt to be retracted. More specifically, the push buttons cause a grooved plate to move horizontally with the upper link being guided in the grooves which are under an angle of 45° thus transferring the horizontal movement of the plate into a vertical movement of the upper link.

WO 03/067004 A1 additionally discloses the use of L-shaped mounting brackets to mount the latch bolt assembly to the support. Each L-shaped mounting bracket has a plurality of openings positioned above one another such that the latch bolt assembly housing may be positioned at a fixed number of different vertical positions with respect to the housing. Bolts are placed transversely through the housing and the L-shaped mounting brackets to fix the housing to the L-shaped mounting brackets.

A downside of the mounting assembly is that height adjustments require removing the housing from the closure system and reattaching it at a different height. This is a time-consuming operation as all transverse bolts need to be unfastened and fastened again.

US 2005/210938 A1 discloses that the link bar extends from the knob and is placed through an opening in a top side of a link, the link being formed by a beam-shaped frame. Likewise, the latch bolt extends upwards with its upper end being placed through an opening in the bottom side of the link and the compression spring engages the latch bolt and the bottom side of the link. The link has a sufficient vertical height such that the knob can be fully depressed and the latch bolt fully retracted while the ends of the link bar and the latch bolt do not engage. The link and link bar may also be substituted by a flexible element. In either embodiment, the knob falls back down due to gravity after being released independently from the operation of the compression spring and the latch bolt.

WO 2014/127399 A1 discloses that the vertically oriented housing of the latch bolt assembly may be provided with means enabling to mount latch accessories onto the housing. To this end, the outside of the housing is provided with front and rear coupling portions. The front coupling portion allows mounting latch accessories, while the back coupling portion acts as a mounting section to mount the latch bolt assembly on the fixed support of the closure system. Latch accessories may include a replaceable cover, a decorative banner, electronic sensors (e.g. an alarm when the closure member is being opened), or alternative operating means (e.g. a door handle). The door handle is attached to a lever arm that extends horizontally towards the link bar. The link bar is provided with projections that engage with the lever arm. Actuation of the door handle causes a rotation of the lever arm which in turn results in an upwards motion of the link bar thus retracting the latch bolt.

WO 2014/127398 A1 relates to the key cylinder positioned near the knob, which key cylinder may prevent movement of the link bar. The key cylinder is positioned adjacent the link bar but in a horizontal configuration. Rotation of the key cylinder (i.e. actuating the key cylinder by turning the key) causes a first lock member to rotate. The first lock member is provided with a single external screw thread that engages a corresponding groove provided on a second lock member. In this way, the rotational motion of the key cylinder is transferred into a sliding motion of the second lock member. The second lock member is provided with a lip and the knob is provided with a corresponding groove. By actuating the key cylinder, the lip of the second lock member engages the groove provided on the knob thus preventing an upwards movement of the knob, effectively locking the closure member in its fastened position.

A downside of this locking mechanism is that the locking mechanism is used to lock the latch bar in its latching position. This may pose a danger in case a user locks the locking mechanism while the gate is opened as this may prevent the latch bolt from entering the keeper and thus leave the gate unfastened.

A drawback of the second kind of magnetic latch assemblies is that a person who wants to open the gate has to have both hands free as he has to pull the bolt of the latching device with one of his hands upward and at the same time he has to open the gate with his other hand. A further drawback of this known latching device is that the keeper assembly has to be positioned perfectly underneath the latch bolt in order to be able to draw the latch bolt by magnetic attraction into the retaining element. Consequently, when the gate sags or otherwise moves somewhat, the distance between the permanent magnet and the latch bolt will become immediately so great that the magnetic attraction will no longer be able to attract the latch bolt against the tension of the compression spring and the gate will thus no longer be latched. A regular check-up and adjustment of the mutual position of the keeper assembly and of the latch bolt assembly is thus required.

Another drawback of the second kind of magnetic latch assemblies is that the key cylinder is placed adjacent the link bar and knob so the latch bolt assembly becomes rather bulky. Moreover, the key cylinder is only accessible from one side of the closure system.

EP 1657383 B1 discloses a pool safety lock. The lock is mounted on a hinged closure member and a corresponding keeper is provided on the fixed support. The lock comprises a slideable latch bolt with a latch bolt spring urging the latch bolt into its latching position. More specifically, the latch bolt is mounted on a frame and has transverse projections that are guided in grooves of the frame. A turning handle is provided on top of the latch bolt assembly and is connected to the latch bolt via a rotatable link bar to allow the latch bolt to be pulled into its retracted position against the force of the latch bolt spring. The lower end of the rotatable link bar is provided with a plastic moulded component which engages a lever. The lever has a fixed top and its bottom engages the latch bolt. A rotation of the plastic moulded component pushes the lever thereby retracting the latch bolt. A locking mechanism is also disclosed in EP 1657383 B1. The locking mechanism comprises a key cylinder which is provided on the latch bolt assembly to allow to lock the latch bolt in its latching position. More specifically, the rotatable link bar has a square cross-section with a circular groove. The locking mechanism comprises a U-shaped bracket having a square opening in its bottom and two upstanding legs. The rotatable link bar is positioned through the U-shaped bracket with the groove being positioned in the square opening. One leg of the U-shaped bracket has an opening that cooperates with the key cylinder. In particular, a rotation of the key cylinder pushes the U-shaped bracket downwards thus causing the square opening to be positioned around the square cross-section of the rotatable link bar and preventing its rotation.

A downside of this pool lock is that the closing may be unreliable. More specifically, since the latch bolt is urged into its extended position, a sufficient closure motion is required in order for the closure member to slam shut with a sufficient force such that the latch bolt is depressed by the slanted surface of the striker. Another drawback of the pool lock is that the key cylinder is placed adjacent the link bar and knob so the latch bolt assembly becomes rather bulky. Moreover, the latch bolt is guided in a frame between its retracted and its extended position. This guidance causes friction which further hampers the reliable closing of the pool lock.

RU 2 239 039 C1 discloses a latch assembly for a cupboard. The latch assembly comprises a latch bolt that is mounted to a frame by means of two levers. The frame is fixed to the cupboard and the levers extend away from the cupboard. As such, when the latch bolt is moved between its open and closed position the distance between the latch bolt and the cupboard varies. More specifically, when closing the latch assembly, the latch bolt is pulled against the inner cupboard surface thereby securely fastening the cupboard doors and avoiding any leeway or slight vibrational motions.

U.S. Pat. No. 2,195,542 A discloses a latch mechanism to avoid rattling or leakage. A latch bolt is mounted to a frame by having two levers attached to its end region. The latch bolt can thus execute a combined sliding and swinging motion.

DISCLOSURE OF THE INVENTION

It is an object of the present invention to at least partially alleviate one or more of the above-mentioned disadvantages.

In a first aspect, the present invention relates to a magnetic latch for fastening a closure member to a support, the magnetic latch comprising a latch bolt assembly configured to be mounted to one of the closure member and the support and a keeper assembly configured to be mounted to the other one of the closure member and the support, the keeper assembly comprising a first magnetic element and the latch bolt assembly comprising: an elongated frame extending in a vertical direction and having two opposing extremities; a latch bolt mounted on the frame at a first one of said two extremities and being moveable between a latching position and a retracted position, the latch bolt comprising a second magnetic element; a latch bolt biasing member arranged to urge the latch bolt into its retracted position, wherein the first magnetic element and the second magnetic element are configured to magnetically attract each other to move the latch bolt into its latching position against the latch bolt biasing member; and a latch bolt operating mechanism including an actuator mounted on the frame at a second one of said two extremities, the latch bolt operating mechanism being configured to, upon actuation of the actuator, move the latch bolt from its latching position to its retracted position against the magnetic attraction between said first and said second magnetic element, the latch bolt operating mechanism comprising: an effort link rod extending in the vertical direction and coupled to the actuator and moveable by a translational motion along the vertical direction from a rest position to an actuated position upon actuation of the actuator; a load link rod extending in the vertical direction and coupled to the latch bolt and moveable by a translational motion along the vertical direction from a rest position to an actuated position upon actuation of the actuator; and a second-order lever interposed between the effort link rod and the load link rod and rotatable about a fulcrum mounted on the frame between a rest position and an actuated position.

In an alternative first aspect, the present invention relates to a magnetic latch for fastening a closure member to a support, the magnetic latch comprising a latch bolt assembly configured to be mounted to one of the closure member and the support and a keeper assembly configured to be mounted to the other one of the closure member and the support, the latch bolt assembly comprising: a latch bolt moveable between a latching position and a retracted position, the latch bolt comprising a first magnetic element; and a latch bolt biasing member arranged to urge the latch bolt into its retracted position, the keeper assembly comprising: an elongated frame extending in a vertical direction and having two opposing extremities; a second magnetic element mounted on the frame at a first one of said two extremities and being moveable between a rest position in which the first magnetic element and the second magnetic element magnetically attract each other to move the latch bolt into its latching position against the latch bolt biasing member and an actuated position; and an operating mechanism including an actuator mounted on the frame at a second one of said two extremities, the operating mechanism being configured to, upon actuation of the actuator, move the second magnetic element from its rest position to its actuated position, the operating mechanism comprising: an effort link rod extending in the vertical direction and coupled to the actuator and moveable by a translational motion along the vertical direction from a rest position to an actuated position upon actuation of the actuator; a load link rod extending in the vertical direction and coupled to the second magnetic element and moveable by a translational motion along the vertical direction from a rest position to an actuated position upon actuation of the actuator; and a second-order lever interposed between the effort and the load link rod and rotatable about a fulcrum mounted on the frame between a rest position and an actuated position.

Both these aspects have the same advantage, namely that the first and/or second magnetic element may be provided with a stronger magnetic attraction. In other words, the latch bolt will be magnetically attracted from a further distance and with a greater force. This is advantageous as it allows for more leeway between the position of the keeper assembly and the latch assembly. In other words, even if the closure member sags or otherwise moves somewhat, the increased magnetic attraction ensures that the latch bolt is attracted against the tension of the compression spring. In particular, the latch bolt may be attracted from distances exceeding 10 mm. A regular check-up and adjustment of the mutual position of the keeper assembly and of the latch bolt assembly is thus also avoided. The increased magnetic attraction is possible due to the second-order lever. More specifically, this second-order lever reduces the force required to unfasten the closure member, i.e. the second-order lever has a fulcrum with the load link rod being closer to the fulcrum than the effort link rod. This force reduction is beneficial since, otherwise, the increased magnetic attraction would make it very difficult and cumbersome to lift the actuator.

In the alternative first aspect, the magnetic latch is of the kind disclosed in AU 2009/251007 A1, AU 2013/206766 A1, 2014/203446 A1, AU 2016/201778 A1, and AU 2018/256525 A1.

In an embodiment, the magnetic attraction between the magnetic elements is generally between 40 and 150 N, preferably between 50 and 100 N, and more preferably between 60 and 90 N. The second-order lever then reduces this force such that the actuator may be actuated by a force between 15 and 60 N, preferably between 20 and 50 N, and more preferably between 25 and 45 N. In this way, the magnetic attraction force is maximized while still allowing the actuator to be actuated with a relatively low force.

In an embodiment, the second-order lever is rotatable in a plane between its rest position and its actuated position, the plane having a component in the vertical direction and in a horizontal direction, the second-order lever being slideable in the horizontal direction with respect to effort link rod and/or the load link rod and/or the frame. This allows for the link rods to remain entirely vertical during actuation since the horizontal movement component (which component is always present in a rotational motion) is effected by the second-order lever.

In a preferred embodiment, the second-order lever comprises a fulcrum opening, an effort opening, and a load opening, the fulcrum being disposed in the fulcrum opening, the effort link rod being connected to the second-order lever by a transverse pin disposed in the effort opening and the load link rod being connected to the second-order lever by a transverse pin disposed in the load opening. In this way, the link rods always engage the second-order lever irrespective of the direction of movement which would not be the case if the link rods would abut against an outer surface of the second-order lever. This increases the robustness and reliability of the magnetic latch and improves its operation.

In a more preferred embodiment, at least two of the fulcrum opening, the effort opening, and the load opening are elongated in the horizontal direction. Elongated openings are a convenient way in order to allow the second-order lever to move horizontally with respect to the link rods, which, as described above, is advantageous as the link rods may remain entirely vertical during actuation.

In an embodiment, the second-order lever comprises a fulcrum opening, an effort opening, and a load opening, the fulcrum being disposed in the fulcrum opening, the effort link rod being connected to the second-order lever by a transverse pin disposed in the effort opening and the load link rod being connected to the second-order lever by a transverse pin disposed in the load opening. In this way, the link rods always engage the second-order lever irrespective of the direction of movement which would not be the case if the link rods would abut against an outer surface of the second-order lever. This increases the robustness and reliability of the magnetic latch and improves its operation.

In an embodiment, the latch bolt operating mechanism further comprises a slideable coupler disposed between the load link rod and the latch bolt and moveable, by a translational motion along the vertical direction, between a releasing position in which the load link rod does not engage the slideable coupler and an engaging position in which the load link rod engages the slideable coupler, and in that the releasing position of the slideable coupler corresponds to the retracted position of the latch bolt and the engaging position of the slideable coupler corresponding to the extended position of the latch bolt. The slideable coupler in fact allows to disengage the actuator from the latch bolt. More specifically, the actuator may be in its rest position while the latch bolt is in its retracted position (i.e. unlatched). As such, once the user releases the actuator, the actuator may return to its rest position, while the latch bolt remains in its retracted position such that the closure member may close without interference from a latch bolt in its latching position.

In an embodiment, the actuator is directly connected to the effort link rod. Preferably, the actuator is connected to the effort link rod by an angular snap-fit joint, the actuator preferably comprising an internal chamber into which a locally widened end of the effort link rod is positioned. A direct connection simplifies the design by avoiding unnecessary connection parts. Moreover, an angular snap-fit joint is a robust connection which is invisible from the outside of the latch bolt assembly.

In an embodiment, the latch bolt is moveable in the vertical direction between its latching position and its retracted position by a translational motion along the vertical direction. The magnetic latch is thus of the kind disclosed in WO 92/03631 A1, WO 03/067004 A1, US 2005/210938 A1, WO 2014/127413 A1, WO 2014/127398 A1, and WO 2014/127399 A1.

In a preferred embodiment, the latch bolt operating mechanism further comprises a slideable coupler disposed between the load link rod and the latch bolt and moveable, by a translational motion along the vertical direction, between a releasing position in which the load link rod does not engage the slideable coupler and an engaging position in which the load link rod engages the slideable coupler, and in that the releasing position of the slideable coupler corresponds to the retracted position of the latch bolt and the engaging position of the slideable coupler corresponding to the extended position of the latch bolt, that latch bolt being fixedly connected to the slideable coupler. The slideable coupler in fact allows to disengage the actuator from the latch bolt. More specifically, the actuator may be in its rest position while the latch bolt is in its retracted position (i.e. unlatched). As such, once the user releases the actuator, the actuator may return to its rest position, while the latch bolt remains in its retracted position such that the closure member may close without interference from a latch bolt in its latching position.

In a more preferred embodiment, the latch bolt comprises a circumferential groove, the latch bolt being connected to the slideably coupler by a pin which is partially positioned within the circumferential groove. A circumferential groove is easy to manufacture in a cylindrical latch bolt and does not significantly weaken the latch bolt (especially when compared to a through opening). Moreover, since the latch bolt is typically made from pure iron (in order to be magnetically attracted to a magnet in the keeper assembly) and the magnetic latch is meant for outdoors use, a surface treatment is required to prevent latch bolt corrosion. This surface treatment is easier to apply in a circumferential groove as compared to a through opening.

In a more preferred embodiment, the latch bolt biasing member comprises a compression spring having a first end engaging the slideable coupler and a second end engaging the frame. A compression spring is an easy to manufacture element which is known to operate in a satisfactory fashion in outdoor applications in particular. Moreover, the behaviour of a compression spring during compression and relaxation is well-known and may be tailored to the specific force required.

In an alternative embodiment, the latch bolt is moveable in a horizontal direction between its latching position and its retracted position by a substantially horizontal motion, the latch bolt operating mechanism further comprising motion conversion means to convert the vertical translation of the load link rod into the substantially horizontal motion of the latch bolt. Preferably, the latch bolt assembly is configured to be mounted on the closure member. A horizontal latch bolt is a conventional set-up for which many keeper assemblies are known. Mounting the latch bolt assembly on the closure member means that a user requires only one hand to open the closure member.

In a second aspect, the present invention relates to a magnetic latch for fastening a closure member to a support, the magnetic latch comprising a latch bolt assembly configured to be mounted to one of the closure member and the support and a keeper assembly configured to be mounted to the other one of the closure member and the support, the keeper assembly comprising a first magnetic element and the latch bolt assembly comprising: an elongated frame extending in a vertical direction and having two opposing extremities; a latch bolt mounted on the frame at a first one of said two extremities and being moveable between a latching position and a retracted position, the latch bolt comprising a second magnetic element, wherein the first magnetic element and the second magnetic element are configured to magnetically attract each other to move the latch bolt into its latching position; a latch bolt operating mechanism including an actuator mounted on the frame at a second one of said two extremities, the latch bolt operating mechanism having a driving part which is moveable, upon actuation of the actuator, by a first translational motion along a first direction from a rest position to an actuated position to move the latch bolt from its latching position to its retracted position against the magnetic attraction and by a second translational motion along a second direction, opposite to said first direction, to move from its actuated position to its rest position; and a locking mechanism mounted on the frame to lock the driving part in its rest position, the locking mechanism comprising: a key actuated cylinder mounted on the frame and having a rotary driving bit which is rotatable upon actuation of the key actuated cylinder along a locking direction and an unlocking direction, opposite to said locking direction; and a locking member mounted on the frame and moveable between an unlocking position in which the driving part is moveable along said first and said second translational motion, and a locking position in which, when the driving part is in its rest positon, it locks the driving part in its rest position, the rotary driving bit being arranged to engage the locking member to move it between its locking position and its unlocking position.

The locking member is directly actuated by the key cylinder such that the locking mechanism may be made in a simpler fashion compared to that in the known magnetic latch disclosed in WO 2014/127398 A1 which requires a motion conversion mechanism to drive the locking member.

In an embodiment, the locking member comprises: a pawl mounted on the frame and moveable between a retracted position in which the driving part is moveable along said first and said second translational motion, and an extended position in which, when the driving part is in its rest positon, it locks the driving part in its rest position; a pawl locking member mounted on the frame and moveable between a locking position in which it locks the pawl in its retracted position, and an unlocking position in which it releases the pawl, the rotary driving bit being arranged to engage the pawl locking member to move it between its locking position and its unlocking position; and a biasing member urging the pawl into its extended position, wherein, when the pawl locking member is in its unlocking position and the drive part is in its actuated position, the pawl is urged into its retracted position by said second translational motion of the drive part. In this embodiment, the pawl and the pawl locking member ensure that the actuator is not fixed in its actuated position in case the locking mechanism would be locked while the actuator is in its actuated position. More specifically, as the pawl is moveable with respect to the pawl locking member, the motion of the drive part (which is connected to the actuator) urges the pawl in its retracted position. Once the drive part has passed the pawl, the biasing member urges the pawl against the pawl locking member to its locking position.

In a preferred embodiment, the biasing member is interposed between the pawl and the pawl locking member. Preferably, the biasing member is a torsion spring. This is a robust design since the pawl is urged into a correct position with respect to the pawl locking member which is driven by the key cylinder. A torsion spring is an easy to manufacture element which is known to operate in a satisfactory fashion in outdoor applications in particular. Moreover, the behaviour of a torsion spring during compression and relaxation is well-known and may be tailored to the specific force required.

In a preferred embodiment, the pawl locking member comprises an abutment surface, the biasing member urging the pawl into engagement with the abutment surface. This is a robust and reliable design since the pawl is urged into a correct position with respect to the pawl locking member.

In a preferred embodiment, the pawl locking member is pivotally connected to the frame, in particular by a transverse pin, to pivot between its locking and its unlocking position and/or the pawl is pivotally mounted on the pawl locking member, in particular by a transverse pin, to pivot between its extended and its retracted position. Using pivotal connections provides a simpler latch bolt since all motions related to the locking mechanism are of a rotational nature and no sliding parts are thus required.

In a preferred embodiment, the locking position of the locking member corresponds to the pawl locking member being in its locking position and the pawl being in its extended position and the unlocking position of the locking member corresponds to the pawl locking member being in its unlocking position and the pawl being in its retracted position. In other words, the position of the pawl locking member determines the possible state of the pawl. More specifically, when the pawl locking member is unlocked, the pawl is always retracted and, when the pawl locking member is locked, the pawl is extended but may be urged aside by the motion of the drive part when going from its actuated to its res position.

In a preferred embodiment, the pawl comprises a pushing surface, the drive part pushing against the pushing surface to urge the pawl to its retracted position when the pawl locking member is in its unlocking position and the drive part is in its actuated position. Such a pushing motion may be the automatic side-effect of the actuator (which is connected to the drive part) returning to its rest position under the influence of gravity. The use of a dedicated pushing surface provides a greater design flexibility in order to ensure that the pawl is pushed aside reliably (e.g. by using an inclined surface).

In an embodiment, the frame comprises a first guide member, in particular a transverse pin, and the locking member comprises a second guide member, in particular a groove, the guide members being arranged to guide the locking member between its locking and its unlocking position. The guiding member improve the robustness and reliability of the magnetic latch as it is avoided that the locking member would be displaced into an undesired position which could lead to damaging and/or blocking the magnetic latch.

In a preferred embodiment, the second guide member comprises a first end region, a second end region and a central part, the central part being delimited by flexible walls and separated by a distance which is smaller than the width of the first guide member. In this way, the flexible walls provide a bi-stable pawl locking member since the first guide member is urged towards either one of the end regions. Moreover, a user will also feel and/or hear a certain click when the first guide member reaches one of the end regions thus providing feedback to the user on the successful opening or closing of the locking mechanism.

In an embodiment, the frame has a width direction and a depth direction that are substantially perpendicular to one another and to the vertical direction, the key actuated cylinder extending through the frame in the depth direction. The provides for a compact and less bulky design compared to the known latches disclosed in WO 2014/127398 A1 and EP 1657383 B1 as the key cylinder is no longer adjacent the link rod, but extends through the frame. Moreover, the key cylinder is now accessible from both sides of the closure member.

In a preferred embodiment, the rotary driving bit is positioned substantially in the centre of the frame in the depth direction. This allows to use commonly available key cylinder (e.g. a single-barrel euro-profile cylinder) in combination with the magnetic latch. Moreover, this provides a well-balanced system and minimizes potential torque-related effects that could be caused by exerting forces on opposing sides of the frame.

In a preferred embodiment, the driving part comprises: a top part extending in the vertical direction and coupled to the actuator, which top part; a bottom part extending in the vertical direction and coupled to the latch bolt, the top part and the bottom part being separated by a distance in the depth direction; and a bridge part extending in the depth direction and connected to the top part on one side and the bottom part on the other side. Preferably, the bottom part comprises a groove through which the key actuated cylinder extends. This allows to place the top part centrally in the frame and the bottom part close to one side of the frame thereby providing room for the rotary driving bit of the key cylinder. The groove in the bottom part is beneficial as this results in a stronger bottom part when compared to a bottom part that only has a single leg.

In a more preferred embodiment, the locking member, in its locking position, engages the bridge part to it lock the driving part in its rest position. The locking member may thus also be placed centrally with respect to the frame thus providing a well-balanced system and minimizing potential torque-related effects that could be caused by exerting forces on opposing sides of the frame.

In a third aspect, the present invention relates to a magnetic latch for fastening a closure member to a support, the support extending in a first (e.g. vertical) direction, the magnetic latch comprising a latch assembly being configured to be mounted to one of the closure member and the support and a keeper assembly configured to be mounted to the other one of the closure member and the support, the keeper assembly comprising a first magnetic element, the latch assembly comprising: a frame; a latch bolt mounted on the frame and being moveable between a latching position and a retracted position along a second (e.g. horizontal) direction which is substantially perpendicular to the first direction, the latch bolt comprising a second magnetic element, wherein the first magnetic element and the second magnetic element are configured to magnetically attract each other to move the latch bolt along a second direction into its latching position; a latch bolt operating mechanism including an actuator mounted on the frame and configured to, upon actuation of the actuator, move the latch bolt from its latching position to its retracted position; and a first lever and a second lever, each lever being pivotally connected to the frame with a pivot axis which extends in a third (e.g. horizontal) direction which is substantially perpendicular to the first direction and to the second direction and the latch bolt being suspended from the levers with the latch bolt being swingable between its latching position and its retracted position, each lever being moveable between a first position which corresponds to the latching position of the latch bolt and a second position which corresponds to the retracted position of the latch bolt.

Suspending the latch bolt from two levers avoids the need for a guiding mechanism as in EP 1657383 B1, which guiding mechanism necessarily increase friction. In other words, a suspended latch bolt is able to move between its retracted and its latched position with nearly no friction which improves the operation and reliability of the latch. Moreover, a horizontally moveable latch bolt is beneficial as compared to a vertically moveable latch bolt such as disclosed in WO 92/03631 A1, WO 03/067004 A1, US 2005/210938 A1, WO 2014/127413 A1, WO 2014/127398 A1, and WO 2014/127399 A1. More specifically, in case the closure member sags over time, the distance between the magnetic elements will likewise increase for a vertical latch bolt thus reducing the magnetic attraction which may lead to a malfunction. This is not the case for a horizontal latch bolt, since the horizontal distance between the magnetic elements is not (significantly) affected by a sagging closure member.

This aspect is particularly beneficial in the context of a magnetic latch. More specifically, in such magnetic latches the latch bolt is attracted by a magnet to its latched position and any friction needs to be overcome by the magnetic attraction. As such, reducing friction allows for a more reliable and improved operation.

In an embodiment, the latch bolt comprises a first and a second protective cover plate to cover the second magnetic element, the protective cover plates being disposed on opposing side of the latch bolt in a further horizontal direction which is perpendicular to the horizontal direction. In case the latch bolt is in its latching position and a user tries to open the closure system, the latch bolt will be pushed against the keeper assembly by its side walls. This could damage the second magnetic element (e.g. an iron core) or at least the protective cover layer which is typically applied to the magnetic element when used for outdoor applications, which protective cover layer avoids oxidizing the second magnetic element.

In an embodiment, the second magnetic element is located at the front of the latch bolt. In this way, the second magnetic element is located as close as possible to the first magnetic element in the keeper assembly which improves the reliability of the magnetic latch.

In an embodiment, the latch bolt operating mechanism comprises a sliding cam and said first lever which forms a cam follower, the sliding cam being moveable by a translational motion in a vertical direction from a first position to a second position thereby moving the operation lever from its first position to its second position. The sliding cam and the first lever thus acts as a motion converting mechanism to convert a vertical sliding motion of the latch bolt operating mechanism into a swinging motion of the latch bolt. Furthermore, the first lever now has a double function, namely suspending the latch bolt and driving the latch bolt, thus providing a compact design with fewer components.

In a preferred embodiment, the sliding cam has a cam surface having an inclination of at most 45° with respect to the vertical direction. The cam surface preferably engages a protrusion on the first lever. Preferably, the protrusion is formed by a pin extending along a further horizontal direction which is perpendicular to the horizontal direction. An inclined surface is a well-known way to transform a sliding motion into a swinging motion. The use of a pin allows for the first lever to be adjacent the sliding cam when viewed in the further horizontal direction thus allowing a compact design of the latch. Moreover, the relatively low inclination reduces the force required for retracting the latch bolt.

In a more preferred embodiment, the first lever is a first order lever with its pivotal connection to the frame being located between its connection to the latch bolt and its engagement with the sliding cam. In this way, the first lever acts as a seesaw about the central first part which acts as a pivot. This allows maximizing the horizontal displacement of the latch bolt. Moreover, the first lever may then also act as a force-reduction or force-magnification (as required) to improve operation of the latch bolt.

In a more preferred embodiment, the first lever moves over an angle between its first and its second position, said angle being between 5° and 45°, preferably between and 30°, more preferably between 13° and 25°, and most preferably between 15° and 20°. It has been found that such a movement angle allows for a minimal vertical displacement while having a sufficient horizontal displacement for practical latch applications.

In an embodiment, the latch bolt operating mechanism comprises a spindle connected to the actuator and a follower fixedly disposed on the spindle, the follower having a rotary driving bit which engages the latch bolt to move the latch bolt from its latching position to its retracted position. This provides an alternative operating mechanism to the sliding cam. Moreover, a spindle is commonly used in a latch bolt operating mechanism relying on a rotary motion (e.g. induced by a door handle as an actuator). Both mechanisms (i.e. a pull knob on top and a door handle) may also be used simultaneously.

In an embodiment, the latch bolt has a non-circular cross-section and is at least partially positioned within a corresponding non-circular opening in the frame. In this embodiment, a rotation of the latch bolt around its longitudinal axis is prevented or at least the forces associated therewith are transferred directly to the frame and are not exerted on the levers thus avoiding having to strengthen the levers.

In an embodiment, the latch bolt, when in its latching position, extends inside the frame over at least 40% of its length and has two side surfaces which oppose one another, the frame having internal walls adjacent to the side surfaces of the latch bolt for at least the area where the latch bolt extends inside the frame in its latching position. When a user tries to open the closure member, a lateral force is exerted onto the latch bolt caused by the latch bolt being pushed against a keeper assembly. In this embodiment, this lateral force is directly transferred (in particular via the protective plates) to the internal walls of the frame thus avoiding that the force would be exerted on the levers thus avoiding having to strengthen the levers.

In an embodiment, the latch bolt comprises a plastic core, the levers being connected to the plastic core. This reduces friction between the latch bolt and the levers when compared to a latch bolt with a metal core. Alternatively or additionally, a non-plastic core may be used and the friction reduction may be obtained by placing a plastic ring between the core and the levers.

In an embodiment, at least one of the levers abuts against the frame in its first position and/or in its second position. In this way, the frame is used in order to limit movement of the levers without requiring additional components.

In an embodiment, the levers are pivotally connected to the latch bolt. This ensures that the latch bolt remains horizontal during its swinging motion which would not be the case with a non-pivotal connection.

In an embodiment, the first lever is connected to the latch bolt at a first location and the second lever is connected to the latch bolt at a second location, the first and second location being separated by a first distance in the horizontal direction. Preferably, the first lever is connected to the frame at a first pivot point and the second lever is connected to the frame at a second pivot point, the first and the second pivot point being separated by a second distance in the horizontal direction, which second distance is substantially similar to the first distance. The larger the distance, the more stable the latch bolt. In particular, the closer the connections are to one another, the more likely that the latch bolt tilts about the connections.

In an embodiment, the latch bolt moves along a curve between its latching position and its retracted position, said curve having a radius of curvature between 1 cm and 20 cm, preferably between 2 cm and 12 cm, more preferably between 3 cm and 8 cm, and most preferably between 4 cm and 6 cm. It has been found that such a radius of curvature and/or such an movement angle allows for a minimal vertical displacement while having a sufficient horizontal displacement for practical latch applications.

In an embodiment, the latch bolt motion between its latching position and its retracted position is symmetrical with respect to the position central between the latching position and the retracted position. This also minimizes the vertical displacement while having a sufficient horizontal displacement for practical latch applications. More specifically, the lowest latch bolt position corresponds to the central position and the highest latch bolt position corresponds to either extreme position (i.e. the latching position or the retracted position) thus minimizing the vertical displacement.

In an embodiment, the latch assembly further comprises a latch bolt biasing member arranged to urge the latch bolt into either its latching position or its retracted position. The biasing member may be either a compression spring engaging the latch bolt or a torsion spring engaging the operation lever or the support lever. In case the latch bolt is urged into its retracted position, the latch is thus unfastened in its rest position which is beneficial in case the closure system is self-closing since the latch bolt will not hamper the closing motion.

In an embodiment, the latch assembly further comprises a strike. This improves the reliability of the latch since the closing motion of the closure system on which the latch is mounted is limited by the strike.

In a fourth aspect, the present invention relates to a mounting assembly comprising: a bracket configured to be fixedly connected to a support; a mounting part extending along a vertical direction and having a width direction and a depth direction that are substantially perpendicular to one another and to the vertical direction, the mounting part having a front side and a rear side which are opposite one another along the depth direction, the mounting part being configured to be mounted with its rear side facing the bracket; and a height adjustment mechanism configured to vary the position of the mounting part with respect to the bracket in the vertical direction, wherein the height adjustment mechanism comprises: a set of first interlocking elements provided on the rear side of the mounting part; an arm connected to the bracket and having a protrusion that is moveable in the depth direction with respect to the bracket between a retracted position and a locking position in which the protrusion interlocks with an interlocking element from said set; a set screw extending along the vertical direction and having a first end and a second end, the set screw being rotatable in a locking direction and an unlocking direction, opposite to the locking direction, wherein the first end of the set screw is externally accessible when the bracket is mounted in a first upright position and the second end of the set screw is externally accessible when the bracket is mounted in a second upright position in which the bracket is upside down with respect to its first upright position; and a threaded portion engaging the set screw such that rotating the set screw causes a vertical movement of the set screw, wherein rotating the set screw in the locking direction pushes the protrusion from its retracted position to its locking position.

In the fourth aspect, the present invention also relates to a mounting assembly comprising: a bracket configured to be fixedly connected to a support; a mounting part extending along a vertical direction and having a width direction and a depth direction that are substantially perpendicular to one another and to the vertical direction, the mounting part having a front side and a rear side which are opposite one another along the depth direction, the mounting part being configured to be mounted with its rear side facing the bracket; and a height adjustment mechanism configured to vary the position of the mounting part with respect to the bracket in the vertical direction, wherein the height adjustment mechanism comprises: a set of first interlocking elements provided on the rear side of the mounting part; an arm connected to the bracket and having a protrusion that is moveable in the depth direction with respect to the bracket between a retracted position and a locking position in which the protrusion interlocks with an interlocking element from said set; a first set screw and a second set screw, each set screw extending along the vertical direction and being rotatable in a locking direction and an unlocking direction, opposite to the locking direction and comprising a first end and a second end, wherein the second ends of the set screws face one another and wherein the first end of the first set screw is externally accessible when the bracket is mounted in a first upright position and the first end of the second set screw is externally accessible when the bracket is mounted in a second upright position in which the bracket is upside down with respect to its first upright position; and a threaded portion engaging each set screw such that rotating said set screw causes a vertical movement thereof, wherein rotating a set screw in the locking direction pushes the protrusion from its retracted position to its locking position.

The height adjustment mechanism operates by converting a rotational motion of the set screw into a vertical translation (in particular by the threaded portion), which vertical translation causes a protrusion mounted on an arm to be displaced away from the bracket (i.e. in the depth direction) towards a set of interlocking elements. Once the protrusion engages one of the interlocking elements, the mounting part is no longer moveable in the vertical direction with respect to the bracket. Since a set of interlocking elements is provided, there are multiple possible position in which the protrusion may engage, i.e. there are multiple different vertical positions of the mounting part with respect to the bracket. Furthermore, this also allows for an easy modification afterwards since loosening a set screw allows to adjust the height, while in the known height adjustment mechanism of WO 2003/67004 A1 multiple screws need to be fully removed to allow the mounting part to be removed and repositioned in its entirety.

Moreover, the use of a set screw with both ends being externally accessible or of two set screws is beneficial. This is particularly advantageous in combination with an L-shaped bracket which is mounted in two different vertical orientations depending on the handedness of the closure member since a first leg of the L-shaped bracket is typically to be positioned between the closure member and the support. Moreover, depending on the shape of the mounting part, once the mounting part is placed on the L-shaped bracket, it may be very difficult to reach both ends of the set screw. As such, depending on the handedness of the closure member, only one end of the set screw (e.g. the lower one) is rotated to cause the protrusion to engage one of the interlocking elements.

In an embodiment, the set of first interlocking elements is formed by a set of parallel grooves. Preferably, the grooves extend substantially in the width direction. Grooves allow for a very accurate placement since they can be placed close together thus allowing small and accurate height adjustments. Moreover, having the grooves extend in the width direction (i.e. in a horizontal direction) limits the total height of the set of grooves when compared to inclined grooves.

In an embodiment, the arm extends substantially in the vertical direction and/or the arm is bendable along a line extending substantially in the width direction. A vertically oriented arm is advantageous as the space available is much larger in the vertical direction than compared to the width direction since the bracket ideally does not extend beyond the support. Moreover, increasing the length of the arm allows for an easier displacement of the protrusion while reducing the risk of breaking the arm. Furthermore, using a bendable arm is a relatively simple design which does not require various moving parts.

In an embodiment, the arm is biased towards the protrusion being in its extended position. In this way, the protrusion lightly engages the interlocking elements. In this way, a user has the sensation of "feeling" when the protrusion is between two interlocking elements and when one interlocking element is passed.

In an embodiment, the bracket is an L-shaped bracket having a first leg and a second leg, the first leg being configured to be fixedly connected to the support and the arm being connected to the second leg. An L-shaped bracket makes it easier to fix the bracket to the closure system as a different leg may be used to fix to the closure system and the remaining leg may be used for the height adjustment mechanism.

In an embodiment, at least one of the second ends of the set screws forms an engagement surface configured to engage the arm to move the protrusion towards its locking position and/or that the second ends of the set screws engage one another to limit vertical movement of the set screws.

In an embodiment, the set screw is formed by a partially threaded rod. Preferably, the partially threaded rod comprises an engagement surface configured to engage the arm to move the protrusion towards its locking position, the partially threaded rod preferably comprising a portion with a reduced diameter with the engagement surface being formed by an edge of the reduced diameter portion of the partially threaded rod, and/or that a stop is provided on the bracket, the second end of the partially threaded rod engaging the stop to limit vertical movement thereof.

These embodiments allow for a flexible design depending on the application and the part to be mounted. Moreover, the use of two set screws is beneficial since only a single threaded rod requires to rotate the rod to be rotated counter-clockwise to fasten the height adjustment mechanism in one of the vertical positions of the bracket, which rotation is counter-intuitive. Both embodiments may be provided with a stop to limit vertical motion, which is user-friendly. An engagement surface is also provided in each embodiment to engage the protrusion.

In an embodiment, the height adjustment mechanism comprises a further arm connected to the bracket, the further arm having a further protrusion that is moveable in the depth direction with respect to the bracket between a retracted position and a locking position in which the further protrusion interlocks with an interlocking element from said set, the arm and protrusion being preferably identical to the further arm and further protrusion. More preferably, the protrusion is formed by a free end of the arm and the further protrusion is formed by a free end of the further arm with the free end and the further free end facing one another. Using two arms improves the reliability of the height adjustment mechanism as two free ends (i.e. protrusions) now engage (different ones of) the interlocking elements thus improving the grip strength. Using identical arms simplifies the design and ensures that both arms behave in a similar fashion. Moreover, having the free ends face one another makes it easy to move both free ends with a single set screw.

Furthermore, using two arms (or one continuous arm fixed at both ends to the bracket) is also beneficial as this results in a latch bolt assembly that is always hanging from one (part of the) arm (i.e. the upper one) and pushing on the other (part of the) arm (i.e. the lower one), while, in case of only a single arm, the latch bolt assembly is either hanging or pushing depending on the orientation. Depending on the tensile strength and/or the compressive strength of the arm, which is mainly determined by its material (e.g. plastic) properties, the arms may be prone to elongation or compression which could result in a shift in height. As such, ensuring that the vertical force is always transferred in the same way (e.g. via the upper or lower arm) avoids a difference in behaviour that could occur when only a single arm is used in two different orientations.

In an embodiment, the arm is made from a flexible plastic material. This allows, among others, to manufacture the arm using injection moulding.

In an embodiment, the mounting part is configured to be fixed to a lock or the mounting part is an integral part of a lock. This provides for a flexible design depending on the application.

In an embodiment, the bracket is provided with vertically oriented guides and the mounting part is provided with corresponding vertically oriented guides which engage with one another in both the width and the depth direction, the bracket being preferably extruded from a metal, in particular aluminium. The guides allow to fix the mounting part also in the remaining two directions since the vertical position is already fixed. Moreover, guides are easy to manufacture during an extrusion process.

In an embodiment, the mounting assembly comprises a fixation element which is fixedly positioned with respect to the bracket, the fixation element comprising the arm and the set screw(s) being positioned between the fixation element and the bracket. This allows to manufacture the fixation element (i.e. the arm and protrusion) from a different material to the bracket, e.g. a plastic fixation element and a metal bracket.

In a preferred embodiment, the bracket is provided with vertically oriented guides, the fixation element engaging, in particular by being slideably inserted in, the guides in both the width and the depth direction, the mounting assembly further comprising at least one connection element to fixedly connect the fixation element to the bracket. More preferably, the at least one connection element comprises at least one nut partially extending in an opening in the bracket and in a hole in the fixation element, the nut preferably forming said threaded portion. Guides are easy to manufacture during an extrusion process such that the bracket is easy to manufacture. Moreover, guides provide a stable connection to the fixation element and may particularly be used for a double functionality (i.e. for connecting to the mounting part as well). Using a nut for the vertical fixation is also beneficial as this is a commonly available element and again is suitable for a double functionality. Moreover, in case two set screws are used each disposed in a nut element, rotating the set screws to abut against one another also urges the nuts away from one another thus jamming them in their respective bracket openings. Moreover, the nut elements ensure that any vertical forces exerted on the fixation element (i.e. exerted on the free end) are directly transmitted to the bracket.

In the fourth aspect, the present invention also relates to a method of mounting a lock to a support using the mounting assembly as described above, the method comprising: fixing the bracket, in particular the L-shaped bracket, to the support in either its first or its second position; sliding the mounting part over the bracket until the desired height is reached; and rotating the set screw to push the protrusion of the arm into an interlocking element. This method has the same advantages as the mounting assembly described above.

In the fourth aspect, the present invention also relates to a method of assembling the mounting assembly, the method comprising: positioning the fixation element on the bracket, in particular in vertical guides provided thereon; placing at least one connection element, e.g. a nut, through an opening in the bracket and into a hole in the fixation element; and screwing the set screw through the connection element. This method has the same advantages as the mounting assembly described above.

In a fifth aspect, the present invention relates to a magnetic latch for fastening a closure member to a support, the magnetic latch comprising a latch bolt assembly configured to be mounted to one of the closure member and the support and a keeper assembly configured to be mounted to the other one of the closure member and the support, the keeper assembly comprising a first magnetic element and the latch bolt assembly comprising: a first elongated housing extending along a vertical direction, the first housing having a front side and a rear side and being configured to be mounted with its rear side facing said one of the closure member and the support; a second housing connected to and positioned underneath the first housing, the second housing have a side face, wherein the second housing is rotatable with respect to the first housing around the vertical direction between a first rotational position in which the latch bolt assembly is operable for a right-handed closure member and a second rotational position in which the latch bolt assembly is operable for a left-handed closure member; a latch bolt mounted in the second housing and being moveable between a latching position and a retracted position along a horizontal direction, wherein the latch bolt in its latching position extends from the side face of the second housing, the latch bolt comprising a second magnetic element, wherein the first magnetic element and the second magnetic element are configured to magnetically attract each other to move the latch bolt into its latching position; and a latch bolt operating mechanism including an actuator mounted on top of the first housing, the latch bolt operating mechanism being configured to, upon actuation of the actuator, move the latch bolt from its latching position to its retracted position against the magnetic attraction between said first and said second magnetic element.

The different rotational positions of the second (i.e. lower) housing allow using a horizontally moveable latch bolt while retaining a symmetrical placement on the closure system (i.e. the combination of the support and the closure member) irrespective of the handedness of the closure member. More specifically, for a right-handed closure member, the second housing is used in the first rotational position, while, for a left-handed closure member, the second housing is used in the second rotational position.

In an embodiment, one of the first housing and the second housing comprises a shaft extending in the vertical direction and having an end face, the other one of the first housing and the second housing comprising a corresponding hollow part which is rotatably mounted on the shaft. The shaft and corresponding hollow part provide for a secure and stable placement of the housings with respect to one another, in particular by reducing possible tilting motions.

In a preferred embodiment, said corresponding hollow part comprises an inner collar having an abutment surface, the latch bolt assembly further comprises a fixation element mounted on the end face of the shaft and axially engaging the abutment surface in the vertical direction. More preferably, the second housing comprises a further abutment surface, said hollow part comprising an end face which axially engages the further abutment surface. Alternatively, the inner collar comprises two opposing abutment surfaces with the end face of the shaft engaging one of said two opposing abutment surfaces in the vertical direction and the fixation element engaging the other one. The inner collar together with the end face of the shaft and the fixation element thus prevent the second housing from moving vertically with respect to the first housing. It is thus not possible to remove the second housing from the first housing even when rotating the second housing between its rotational positions. This simplifies setting the second housing in the desired orientation since little assembly is required. The fixation element may be formed by one or multiple elements and may include a bolt, a screw, a clip, etc. Moreover, the end face of the hollow part and the further abutment surface or the inner collar with two opposing abutment surfaces and the shaft end face avoid any possible vertical shifts between the housings.

In an embodiment, one of the first housing and the second housing comprises a first stop and a second stop, the other one of the first housing and the second housing comprising a protrusion which engages the first stop when the second housing is in its first rotational position and which engages the second stop when the second housing is in its second rotational position. This is user-friendly since the second housing cannot be over rotated which could lead to issues. More specifically, typically, once the second housing is correctly positioned, the position will be fixed by fixation means (e.g. a bolt or the like). However, in case of over rotation, it may not be possible to apply the fixation means correctly.

In a preferred embodiment, the inner collar provides the stops. Preferably, the protrusion comprises the fixation element and more preferably the protrusion further comprises a vertically extending protrusion, the fixation element engaging the first stop and the vertically extending protrusion engaging the second stop. Using the inner collar additionally as the stops is beneficial as it reduces the number of components required and generally simplifies the design. The same applies when using the fixation element for multiple functions.

In an embodiment, the second housing comprises two opposing sides adjacent the side face, the two opposing sides being symmetrical to one another. The opposing sides form the front and rear side of the second (lower) housing. Having them symmetrical is beneficial as the roles of these sides are reversed with one another depending on the rotational position of the second housing.

In a preferred embodiment, each of said opposing sides comprises identical coupling means (e.g. a guide, rail or the like), the latch bolt assembly preferably further comprising a stop mounted, using the coupling means, to a first one of said two opposing sides when the second housing is in its first rotational position and to a second one of said two opposing sides when the second housing is in its second rotational position. Having identical coupling means on the opposing sides is beneficial as this allows mounting (or coupling) a same component to either side depending on the rotational position of the second housing, thus reducing the required number of components. Moreover, due to the reversible mounting, the stop is suitable for a closure system irrespective of the handedness.

In a more preferred embodiment, further coupling means are provided on the rear side of the first housing, which further coupling means are continuous with said coupling means on the opposing sides of the second housing. Having continuous further coupling means is beneficial as this allows the latch bolt assembly to be slid onto mounting brackets on the closure system.

In an embodiment, the latch assembly further comprises a releasable fixation member to fix the second housing to the first housing in either one of its first and its second rotational position. This avoids any accidental rotation of the second housing with respect to the first housing.

In an embodiment, the second housing is rotatable with respect to the first housing around the vertical direction between the first rotational position and the second rotational position over an angle comprised between 140° and 220° and particularly between 170° and 190°, which angle is most particularly about 180°. Although a rotation angle of about 180° is preferred because this enables the latch bolt to be parallel to the front/rear side of the second housing, other angles are also possible.

In an embodiment, the latch bolt assembly comprises a latch bolt biasing member arranged to urge the latch bolt into its retracted position. The latch bolt is thus retracted when the closure member is unfastened thus providing a reliable closing of the closure member even in cases when the closure member is only partially opened where it could occur that the closure member is not closing fast enough to ensure the extended latch bolt to be depressed when striking an inclined surface on the support.

In an embodiment, the latch bolt operating mechanism comprises: a vertically extending link rod mounted in the first housing and having a lower end, the vertically extending link rod being slideable in the vertical direction from a rest position to an actuated position upon actuation of the actuator; a sliding cam connected to the lower end of the link rod and being moveable by a translational motion in a vertical direction from a first position to a second position; and a follower lever pivotally connected to the second housing and connected to the latch bolt, the sliding cam engaging the follower lever to move the follower lever from a rest position to an actuated position upon actuation of the actuator thereby sliding the latch bolt from its latching position to its retracted position, wherein the sliding cam is rotatable with respect to the link rod around the vertical direction, in particular over an angle comprised between 140° and 220° and more particularly between 170° and 190°, which angle is most particularly about 180°. The sliding cam is a convenient way of transforming the vertical sliding motion of the link rod into a horizontal motion of the latch bolt. The latch bolt lever and the sliding cam rotate together with the second housing, while the link rod is irrotationally fixed to the first housing.

In a preferred embodiment, the vertically extending link rod comprises a lower end and the sliding cam comprises a chamber having a top opening through which the link rod extends, the lower end being disposed within the chamber and engaging the chamber in the vertical direction. The chamber forms a convenient way to connect the sliding cam to the link rod such that there is no or only minimal vertical leeway, while allowing the 180° rotation desired for the second housing.

In the fifth aspect, the present invention also relates to a method of mounting the latch bolt assembly of the magnetic latch onto one of the closure member and the support, the method comprising: rotating the second housing into one of its first and its second rotational position; fixing the second housing in said one of its first and its second rotational position, in particular by fastening a releasable fixation member; mounting the first elongated housing and/or the second housing to said one of the closure member and the support; and optionally, fixing a stop to the front side of the second housing. This method has the same advantages as the magnetic latch of the fifth aspect described above.

It will be readily appreciated that, as will also become evident from the further description, that the above mentioned aspects of the invention and the various embodiments (incl. preferred, more preferred, advantageous, more advantageous, alternative, etc. embodiment and/or other optionally indicated features) should not be limited to individual elements, but may be combined with one another to achieve even other embodiments than those already described, which embodiments may also be part of the present invention as defined in the appended claims.

BRIEF DESCRIPTION OF THE DRAWINGS

The invention will be further explained by means of the following description and the appended figures.

FIGS. 16A and 16B show a partially exploded view of the latch bolt assembly of FIGS. 11A and 11B.

DESCRIPTION OF THE INVENTION

Figure 1:
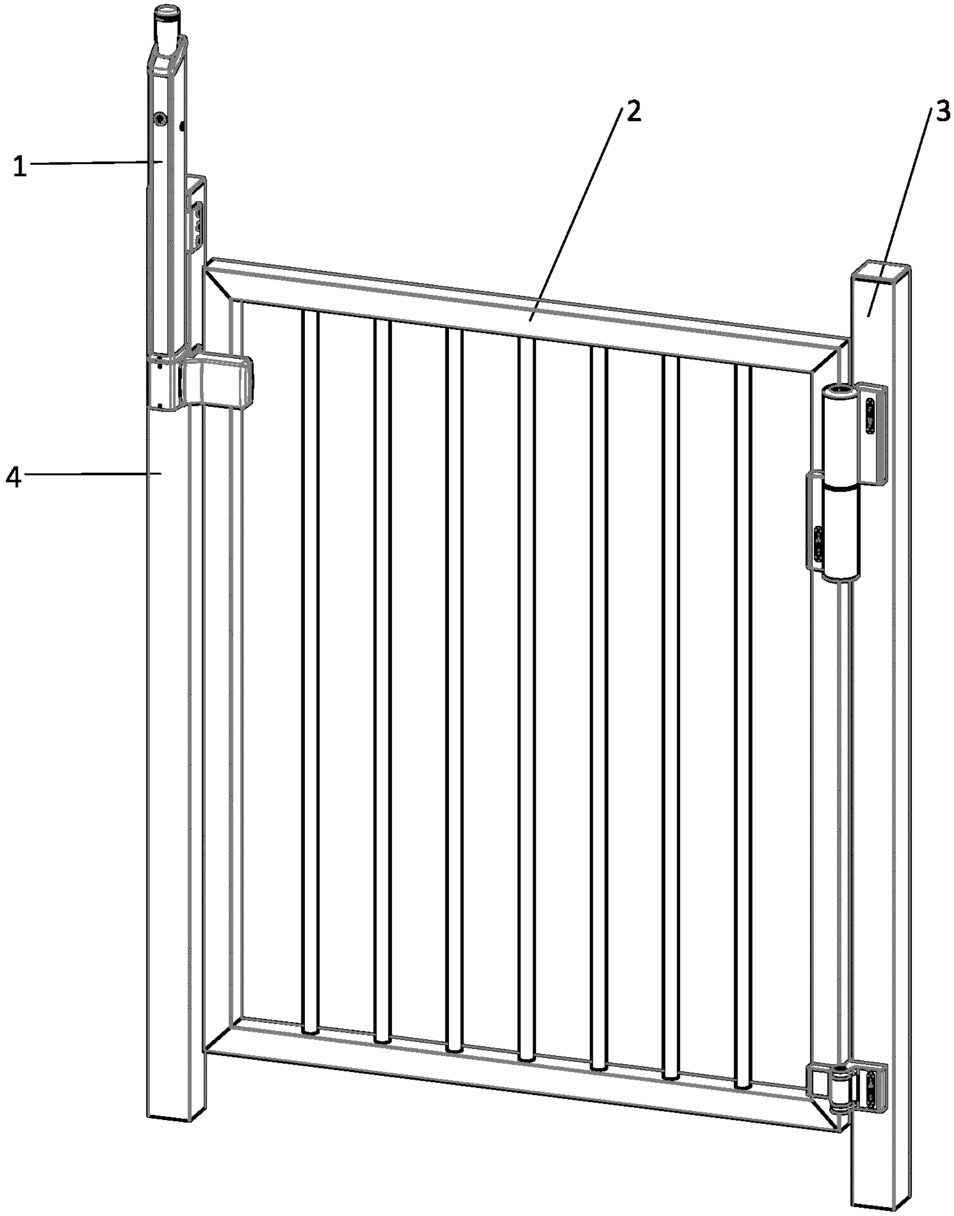
FIG. 1 shows a perspective view of an embodiment of a magnetic latch assembly mounted on a closure system.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the various embodiments, although referred to as "preferred" are to be construed as exemplary manners in which the invention may be implemented rather than as limiting the scope of the invention.

FIG. 1 shows a perspective view of a first embodiment of a magnetic latch assembly 1 mounted on a closure system. The closure system comprises a closure member 2 that is hinged on a first support 3 and that may be fastened to a second support 4 by means of the magnetic latch assembly 1. In the illustrated embodiment, the closure member 2 is formed by a gate and the supports 3, 4 are formed by fixed posts, but it will be readily appreciated that the magnetic latch assembly 1 is also suitable for other kinds of closure members (e.g. a sliding closure member, a door, etc.) and/or supports. For example, the support may be formed by a closure member in case the magnetic latch assembly 1 is used on a double gate.

Figure 2:
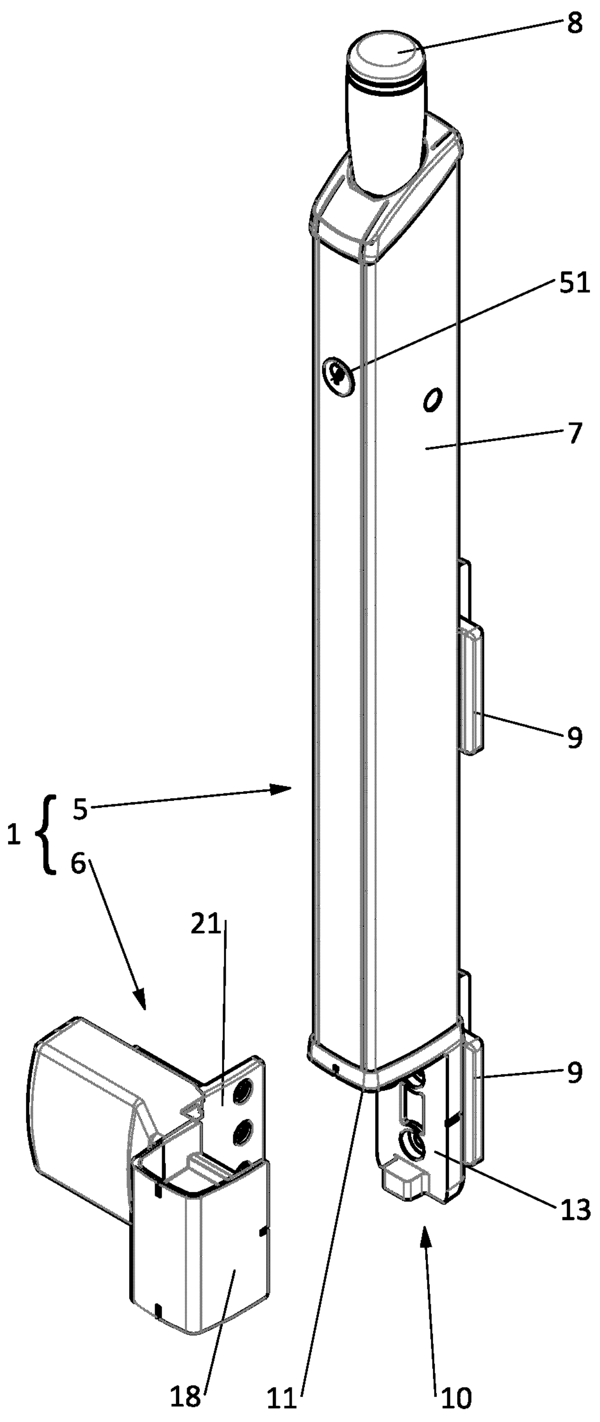
FIG. 2 shows a perspective view of the latch bolt assembly and the magnetic keeper assembly that form the magnetic latch assembly of FIG. 1.

The magnetic latch assembly 1 generally comprises a latch bolt assembly 5 and a magnetic keeper assembly 6 as shown in FIG. 2. In the illustrated embodiment, the latch bolt assembly 5 is mounted on the support 4 and the magnetic keeper assembly 6 is mounted on the closure member 2, but it will be readily appreciated that these may be reversed. As shown in FIG. 2, the latch bolt assembly 5 comprises a vertically oriented elongated housing 7 with a pull knob 8 protruding from the top thereof. The housing 7 is mounted on the closure member 2 using two L-shaped mounting brackets 9. Preferably, the height of the housing 7 with respect to the mounting brackets 9 is adjustable in order to vertically align the latch bolt assembly 5 mounted on the support 4 to the magnetic keeper assembly 6 mounted on the closure member 2. At the bottom of the housing 7, there is provided an L-shaped bracket 10 having one leg 11 fastened to the bottom of the housing using screws 12 (see FIG. 3A) and a second leg 13 which is located opposite the magnetic keeper assembly 6 and to which the bottom L-shaped mounting bracket 9 is fastened. The L-shaped bracket 10 is open at both sides in order to engage with the magnetic keeper assembly 6 on either side such that the latch bolt assembly 5 is operable for both right-handed and left-handed closure members 2 without any modifications. It will be readily appreciated that the elongated housing 7 may be regarded as a frame on which the various components of the latch bolt assembly are mounted. The operation of the latch bolt assembly 5 will be described in more detail by reference to FIGS. 3A to 8C. The magnetic keeper assembly 6 will be described in more detail by reference to FIGS. 9A to 9C.

Figure 3A:
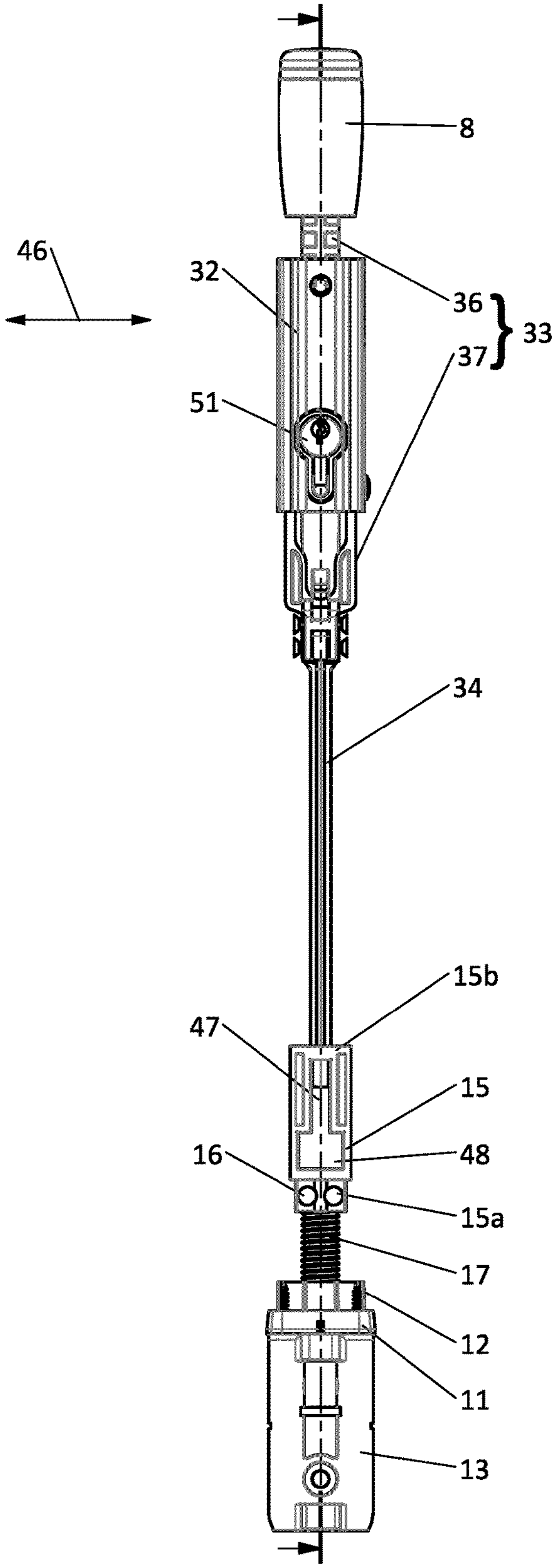
FIG. 3A shows a front view of the latch bolt assembly of FIG. 2 with the housing having been removed and with the latch bolt in its latched state.
Figure 3B:
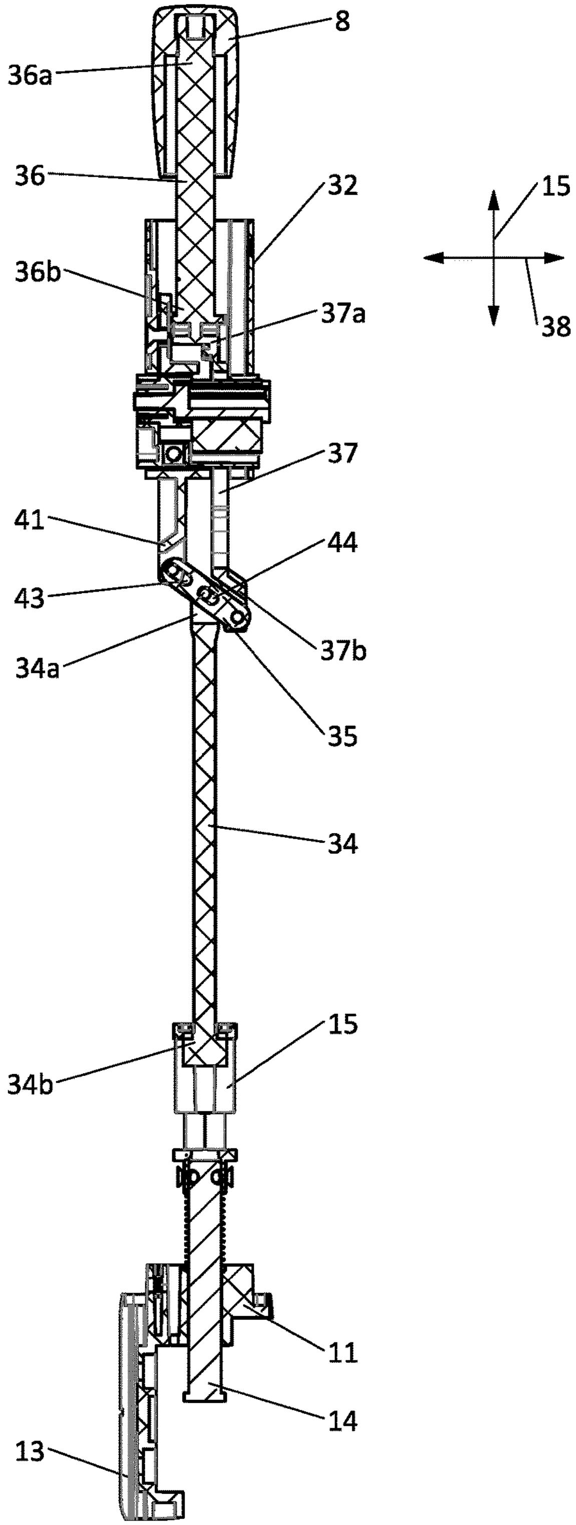
FIG. 3B shows a cross-section through the latch bolt assembly along plane CA' indicated in FIG. 3A.

FIGS. 3A and 3B show the latch bolt assembly 5 in its latched position, i.e. where the closure member 2 is fastened to the support 4. The latch bolt assembly 5 comprises a latch bolt 14 at its bottom. More specifically, the latch bolt 14 extends through the first leg 11 of the L-shaped bracket 10 and is moveable in the vertical direction 15 between an extended position (shown in FIGS. 3A and 3B) and a retracted position (shown in FIGS. 4A to 5B). The latch bolt 14, at its upper end 14*a*, is fixedly connected to a slideable coupler 15, in particular to the lower end 16A thereof, in particular by a transversely positioned pin 16. More specifically, the latch bolt 14 is provided with a circumferential groove (best shown in FIG. 3A) and the transversely positioned pin 16 (e.g. a rivet) partially engages part of this circumferential groove. A latch bolt spring 17 is positioned between the coupler 15 and the top side of the L-shaped bracket 10. In the illustrated embodiment, the latch bolt spring 17 is a compression spring which urges the upper end of the latch bolt 14 upwards, i.e. away from the top side of the L-shaped bracket 10. As such, the latch bolt 14 is urged by the latch bolt spring 17 towards the retracted position.

Figure 9C:
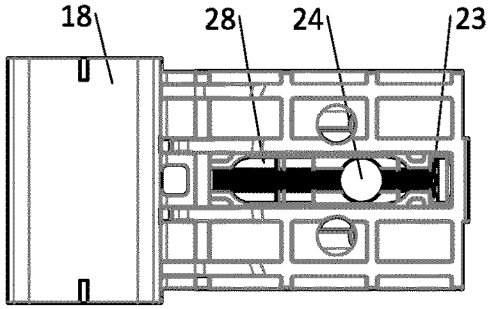
FIG. 9C shows a rear side view of the magnetic keeper assembly of FIG. 2.
Figure 9B:
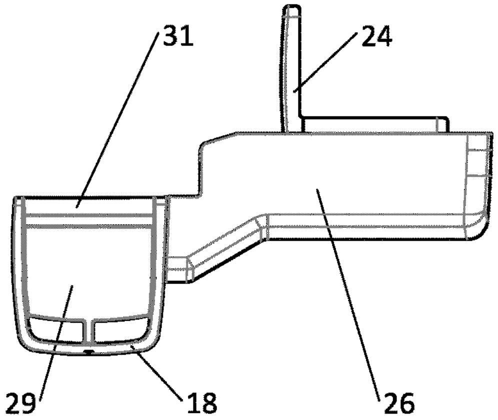
FIG. 9B shows a top view of the magnetic keeper assembly of FIG. 2.
Figure 9A:
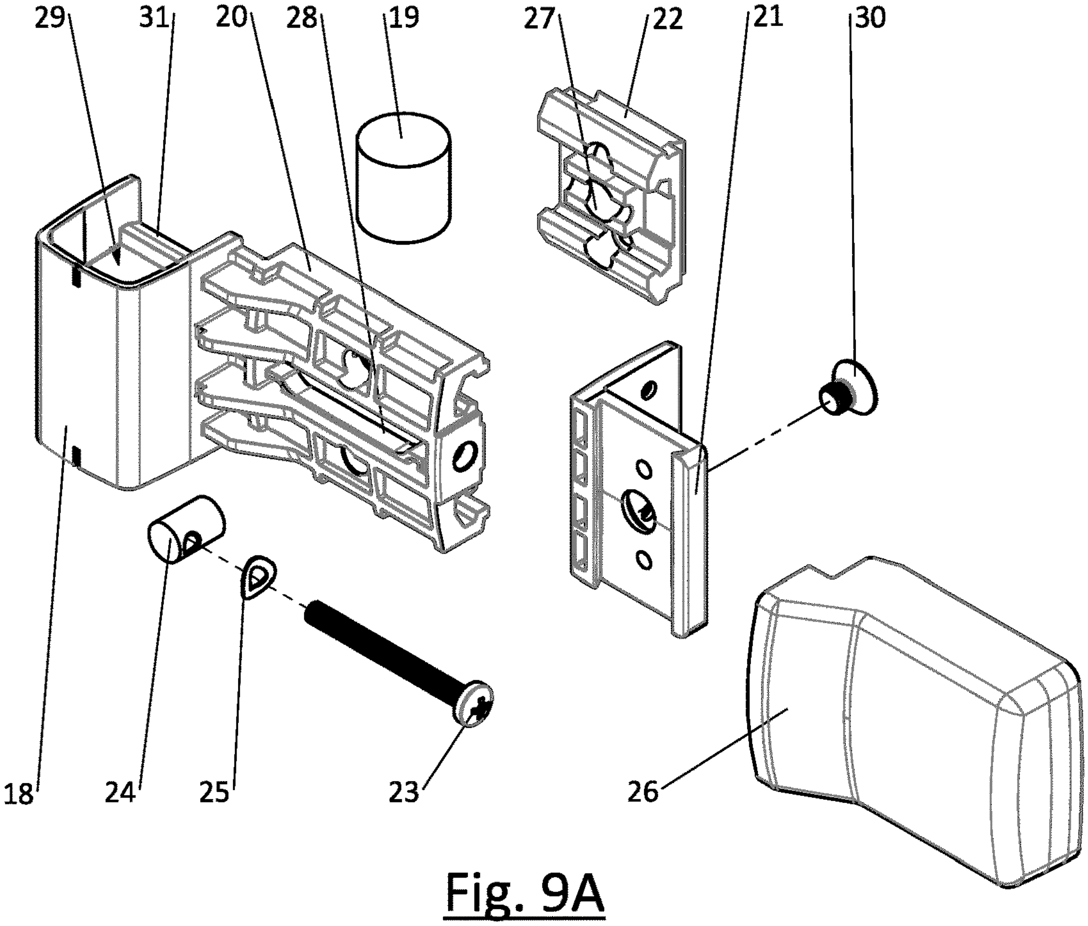
FIG. 9A shows an exploded view of the magnetic keeper assembly of FIG. 2.

The magnetic keeper assembly 6 is shown in an exploded view in FIG. 9A and comprises a keep 18 which houses a magnet 19, in particular a permanent magnet, although it will be readily appreciated that an electromagnet is also feasible. The keep 18 has an elongated part 20 on its side in order to allow the keep 18 to be mounted on the closure member 2 by means of an L-shaped mounting bracket 21. More specifically, the L-shaped mounting bracket 21 is mounted to the closure member 2 and a horizontal guide 22 is mounted directly on the L-shaped mounting bracket 21 (and fixed thereto by means of screw 30) with the elongated part 20 of the keep 18 being mounted on the horizontal guide 22. A setting screw 23 and corresponding setting nut 24 are provided in order to horizontally adjust the position between the keep 18 and the horizontal guide 22. More specifically, the setting nut 24 is positioned on one side within a corresponding hole 27 on the horizontal guide and with the other side in a horizontal groove 28 in the elongated part 20. The setting nut 24 is provided with an internal screw thread corresponding to that of the setting screw 23. A rotation of the setting screw 23 causes the setting nut 24 to slide along the length of the setting screw 23 (as best shown in FIG. 9C) thus causing the keep 18 to slide horizontally with respect to the horizontal guide 22 that is fixedly positioned on the closure member 2. This allows to correctly position the keep 18, in particular the latch bolt receiving area 29, with respect to the latch bolt assembly 5 mounted on the support 4. A curved washer 25 may be provided between the setting screw 23 and the setting nut 24. A cover 26 is provided in order to finish the magnetic keeper assembly 6.

When the closure member 2 is closed (as illustrated in FIG. 1), the magnet 19 provided in the magnetic keeper assembly 6 exerts a force on the latch bolt 14 thereby attracting the latch bolt 14 against the force of the latch bolt spring 17 to its latching position. As such, the latch bolt 14 is manufactured from a ferromagnetic material, preferably iron. When the latch bolt 14 is in its latching position, it, in particular its lower end 14*b*, is kept by the keep 18, in particular in the latch bolt receiving area 29, the magnetic keeper assembly 6 in order to fasten the closure member 2 to the support 4. More specifically, when the latch bolt 14 is in its latched position in the keeper 18, the bottom part of the latch bolt 14, when attempting to open the closure member 2, pushes against the bounding wall 31 of the latch bolt receiving area 29.

The latch bolt assembly 5 is generally provided with a latch bolt operating mechanism which allows to retract the latch bolt 14 against the force of the magnet 19 in order to unfasten the closure member 2 with respect to the support 4. In the illustrated embodiment, the latch bolt operating mechanism comprises a frame 32 that is fixed to the housing 7, the knob 8 at the top of the housing 7, an upper link rod 33 connected to a lower link rod 34 by a lever 35.

The upper link rod 33 comprises a top part 36 and a bottom part 37 connected by a horizontal plate 39 such that these parts 36, 37 are located in a different position when viewed in the depth direction 38 (see FIG. 3B) of the latch bolt assembly 5. The reasons as to why the upper link rod 33 is so split will be described below with reference to FIGS. 6 to 8C. The top part 36 of the upper link rod 33 has an upper end 36*a* on which the knob 8 is fixed and a lower end 36*b* that is fixed on the horizontal plate 39. The bottom part 37 of the upper link rod 33 has an upper end 37*a* that is fixed on the horizontal plate 39 and a lower end 37*b* that is connected to the lever 35.

In the illustrated embodiment, the knob 8 is fixed to the upper end 36*a* of the upper link rod 33 by an angular snap-fit joint. The angular snap-fit joint is best shown in FIG. 3B. The angular snap-fit joint comprises a chamber within the knob 8, which chamber has a larger cross-section at the top and a smaller cross-section at the bottom. The upper end 36*a* of the upper link rod 33 has a corresponding locally thicker part. When assembling the latch bolt assembly 5, the knob 8 is slid onto the upper link rod 33 of which the thicker top part is compressed and the re-expands to fill the chamber. This provides a robust connection which is moreover invisible from the outside of the magnetic latch 1. In the illustrated embodiment, the knob 8 is made from metal, while the upper link rod 33 is made from a plastic material.

The lever 35 has a first end 35*a*, a central part 35*b*, and a second end 35*c*. The lower end 37*b* of the bottom part 37 of the upper link rod 33 is connected to the first end of the lever 35 by means of a pin 40 transversely placed extending through openings (not shown) in the lower end 37*b* of the bottom part 37 of the upper link rod 33 and the first end 35*a* of the lever 35. The frame 32 has a vertically oriented protrusion 41 which has a upper end 41*a* fixed to the frame 32 and a lower end 41*b* which is connected to the second end 35*c* of the lever 35 by means of a pin 42 transversely placed extending through an opening (not shown) in the lower end 41*b* of the protrusion 41 and through an elongated opening 43 in the second end 35*c* of the lever 35. The central part 35*b* of the lever 35 also has an elongated opening 44 used for connecting the upper end 34*a* of the lower link rod 34 to the lever 35 by means of a pin 45 transversely placed extending through an opening (not shown) in the upper end 34*a* of the lower link rod 34 and through the elongated opening 44.

Figure 4A:
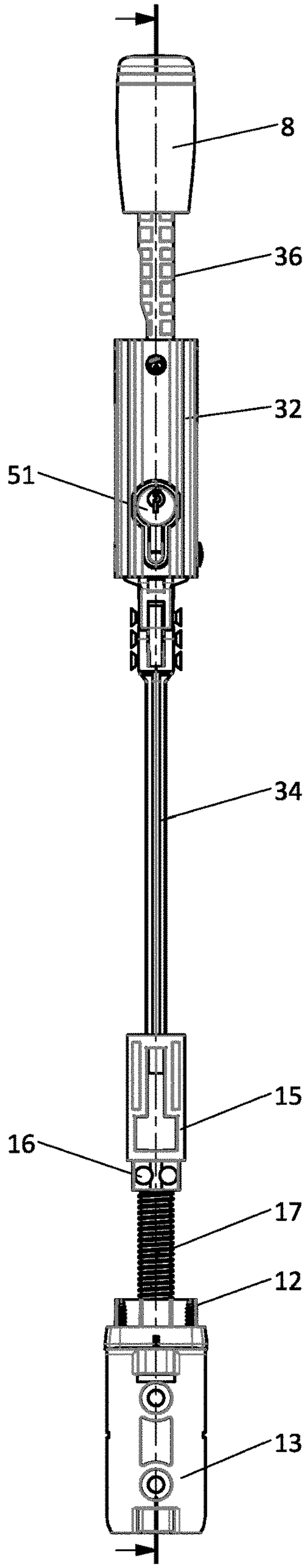
FIG. 4A shows a front view of the latch bolt assembly of FIG. 2 with the housing having been removed and with the latch bolt in its retracted state and the knob in its actuated position.
Figure 4B:
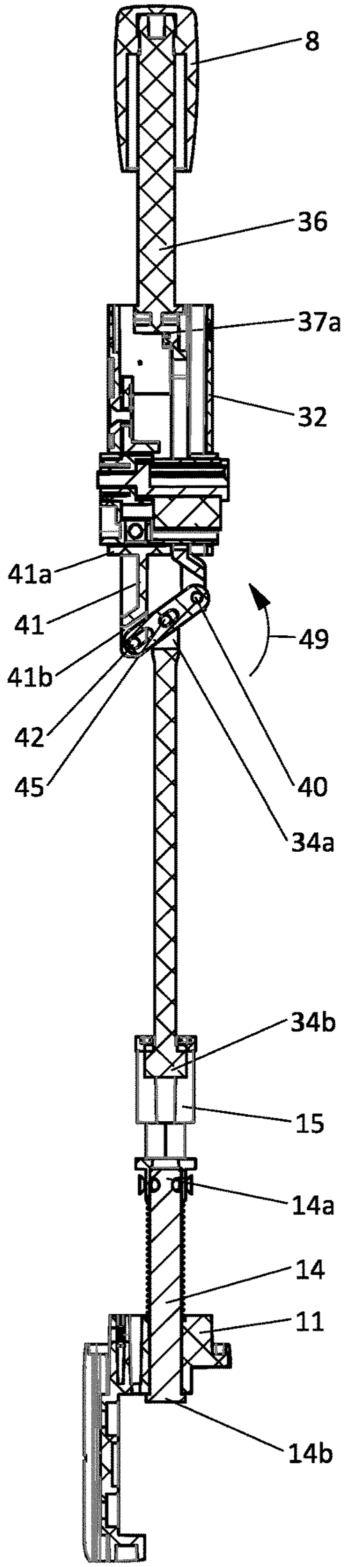
FIG. 4B shows a cross-section through the latch bolt assembly along plane CA' indicated in FIG. 4A.

The lever 35 is rotatable about its second end 35*c* between a rest position (shown in FIGS. 3A, 3B, 5A and 5B) and an actuated position (shown in FIGS. 4A and 4B). More specifically, the first end 35*a* of the lever 35 is able to rotate, in particular over an angle of about 90°, with respect to the transverse pin 42 around the width direction 46 (indicated in FIG. 3A). The elongated openings 43, 44 allow the upper link bar 33 and the lower link bar 34 to remain vertically oriented during the rotation of the lever 35 as the lever 35 can slide in the depth direction 38 with respect to the lower end 37*b* of the upper link bar 33 and the upper end 34*a* of the lower link bar 34, which sliding motion would not be possible in case the openings 43, 44 were circular.

The lower link rod 34 has a lower end 34*b* that engages the slideable coupler 15. More specifically, the upper end 16B of the coupler 15 has an opening (not shown) through which the lower link rod 34 extends. The lower end 34*b* of the lower link rod 34 is so shaped that it cannot pass through the opening in the upper end 16B of the coupler 15 as best in FIG. 3B. The coupler 15 has a vertically oriented groove 47 and the lower end 34*b* is guided in this groove 47. The coupler 15 is slideable between a lower position (shown in FIGS. 3A and 3B) and an upper position (shows in FIGS. 4A to 5B). The lower position of the coupler 15 corresponds to the latched position of the latch bolt 14 and the upper position of the coupler 15 corresponds to the retracted position of the latch bolt 14 because the upper end 14*a* of the latch bolt 14 is fixed to the lower end 16A of the coupler as described above. The coupler 15 further has an opening 48 adjacent the groove 47, which opening 48 allows to place the coupler 15 on the lower end 34*b* of the lower link rod 34.

Figure 5A:
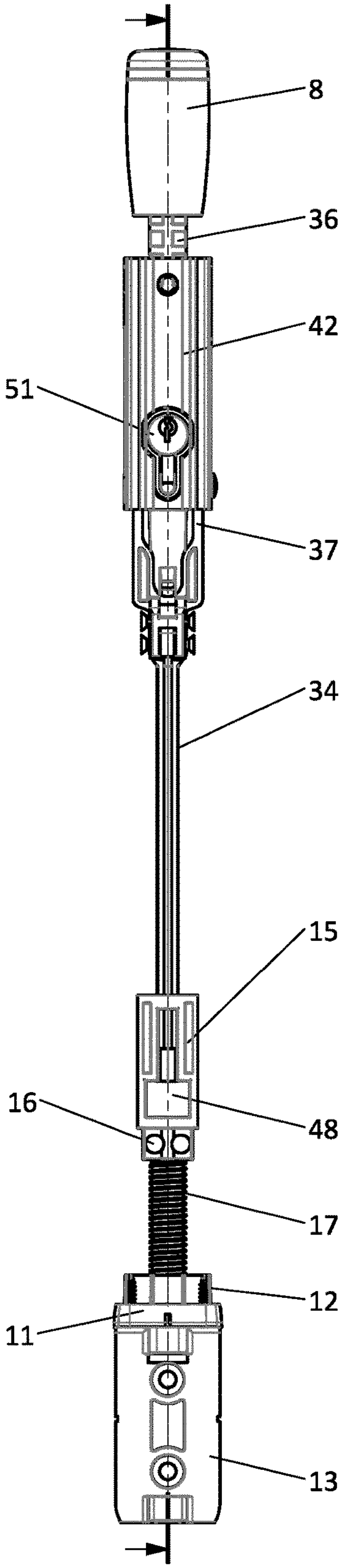
FIG. 5A shows a front view of the latch bolt assembly of FIG. 2 with the housing having been removed and with the latch bolt in its retracted state and the knob in its rest position.
Figure 5B:
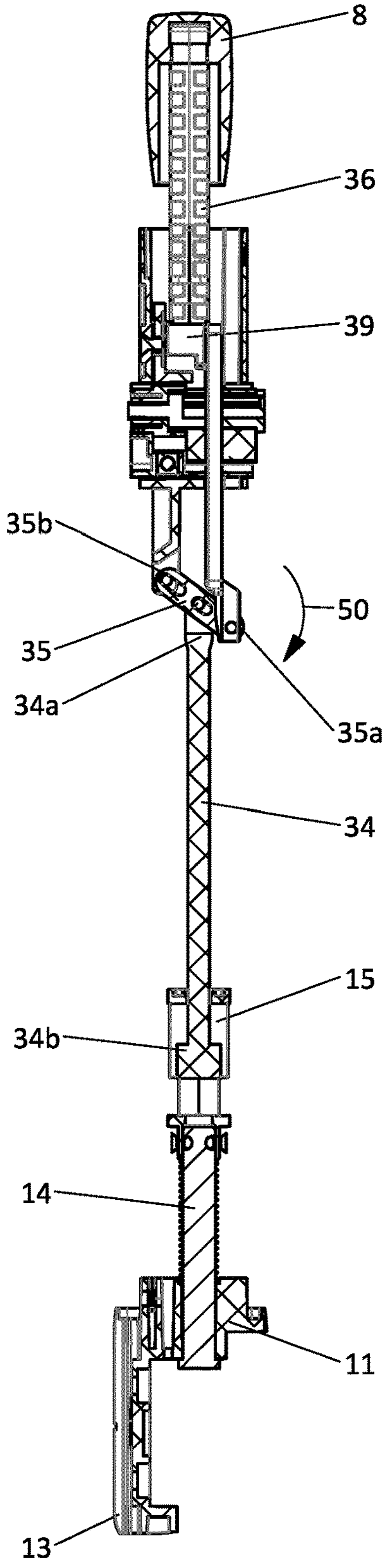
FIG. 5B shows a cross-section through the latch bolt assembly along plane CA' indicated in FIG. 5A.
Figure 6:
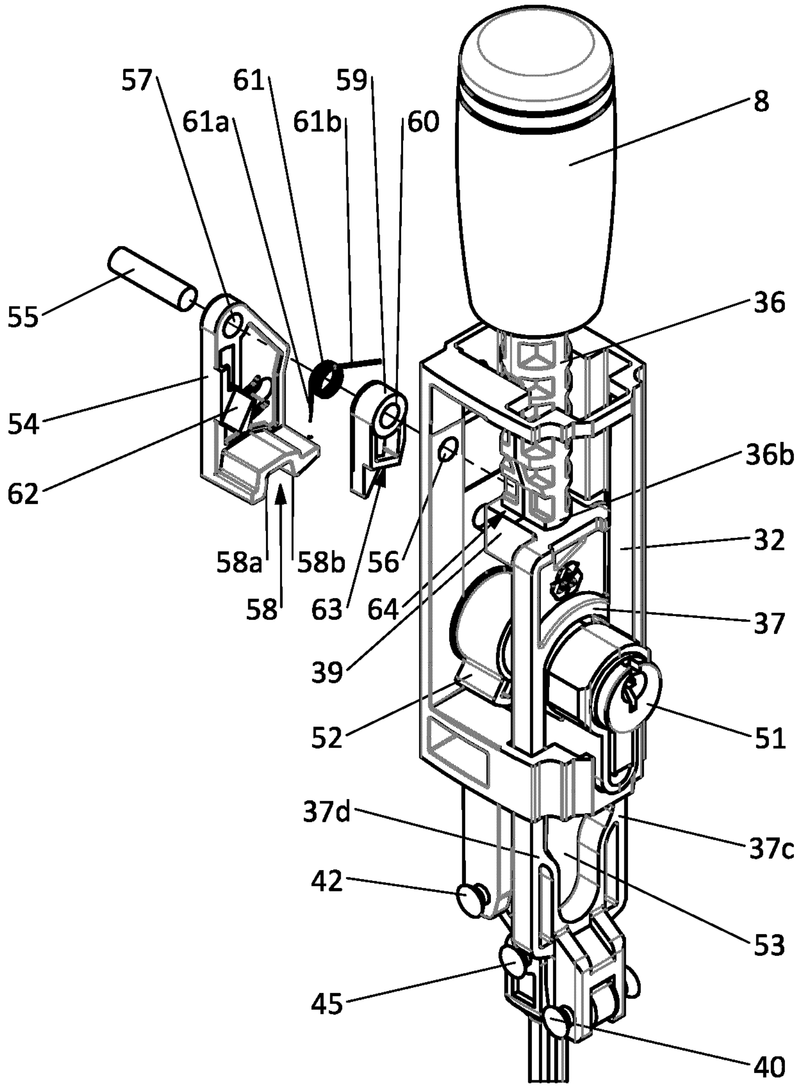
FIG. 6 shows a perspective, partially exploded, view of the top part of the latch bolt assembly of FIG. 2 with the housing having been removed and with the knob in its rest position.

The latch bolt assembly 5 operates in the following way. FIGS. 3A and 3B show the latch bolt 14 in its latching position due to the magnetic attraction from the magnet 19 in the magnetic keep assembly 6. When a user desires to open the closure member 2, the user pulls the knob 8 upwards from its rest position to its actuated position as shown in FIGS. 4A and 4B. The upwards movement of the knob 8 causes the upper link rod 33 to move upwards (i.e. the upper link rod 33 undergoes an upwards translational motion) thereby rotating the first end 35*a* of the lever 35 in a first rotational direction 49 and pulling the lower link rod 34 upwards (i.e. the lower link rod 34 undergoes an upwards translational motion). Because the lower end 34*b* of the lower link rod 34 is abutting the upper end 16B of the coupler 15, the coupler 15 is pulled upwards which in turn pulls latch bolt 14 upwards to its retracted position (i.e. the latch bolt 14 and the coupler 15 undergo an upwards translational motion). Once the latch bolt 14 is in its retracted position, the closure member 2 is unfasted and the user may open the closure member 2 and the knob 8 may be let go. Gravity will cause the knob 8 to fall downwards to its rest position as shown in FIGS. 5A and 5B. The downwards movement of the knob 8 causes the upper link rod 33 to move downwards (i.e. the upper link rod 33 undergoes a downwards translational motion) thereby rotating the first end 35*a* of the lever 35 in a second rotational direction 50 (which is opposite to the first rotational direction 49) and pushing the lower link rod 34 downwards (i.e. the lower link rod 34 undergoes a downwards translational motion). Since the lower end 34*b* of the lower link rod 34 is free to slide within the groove 47 in the coupler 15, the coupler 15 is not affected by the motion of the lower link rod 34. Rather, the coupler 15 remains in its upper position due to the latch bolt spring 17 thus keeping the latch bolt 14 in its retracted state. When the closure member 2 is again closed (either due to the user or due to the provision of self-closing means, e.g. a self-closing hinge), the magnet 19 again attracts the latch bolt 14 thus pulling the latch bolt 14 and the coupler 15 downwards (i.e. the latch bolt 14 and the coupler 15 undergo a downwards translational motion) against the latch bolt spring 17 to the configuration shown in FIGS. 3A and 3B.

The force required to unfasten the closure member 2 is effectively determined by the magnetic field strength H of the magnet 19, the shape of the latch bolt 14 and the configuration of the lever 35. Increasing the magnetic field strength H increases the force exerted on the latch bolt 14. A likewise effect may be achieved by increasing the volume of the latch bolt 14 as this also increases the magnet force exerted thereon. However, this results in a bulkier latch bolt assembly 5 which is undesired. A higher attraction force is beneficial as this allows to attract the latch bolt 14 from greater distances thus allowing more leeway between the support 4 and the closure member 2. However, a downside of a higher attraction force is that the user has to exert a higher force on the knob 8 in order to retract the latch bolt 14. The lever 35 alleviates this effect since it causes a force reduction between the lower link rod 34 and the upper link rod 33. In other words, the lever 35 is a second-order lever with the upper link 33 being the effort and the lower link 34 being the load and the transverse pin 42 forming the fulcrum.

In the illustrated embodiment, the magnet 19 is a neodymium magnet with 22 kg of retaining force and a height and diameter of 25 mm. The magnet 19 exerts an attraction force on the latch bolt 14 (which latch bolt 14 has a diameter of 12 mm in the illustrated embodiment, but other diameters are possible) between 65 and 70 N and the lever 35 reduces the force such that the knob 8 can be lifted by applying a pulling force between 30 and 40 N. However, other force values are also possible. In general, the force required to pull the knob 8 is between 15 and 60 N, preferably between 20 and 50 N, and more preferably between 25 and 45 N. The magnetic attraction force exerted on the latch bolt 14 is preferably as large as possible and may generally be between 40 and 150 N, preferably between 50 and 100 N and more preferably between 60 and 90 N. This allows to attract the latch bolt 14 from distances exceeding 10 mm thus allowing more leeway between the support 4 and the closure member 2.

The latch bolt assembly 5 is also provided with a key cylinder 51 that allows to lock the closure member 2 in its fastened position with respect to the support 4. In other words, the key cylinder 51 is part of a locking mechanism that prohibits movement operation of the latch bolt operating mechanism. The locking mechanism will be described with respect to FIGS. 6 to 8C. The key cylinder 51 is a Euro-cylinder corresponding to standard DIN 18252/2006 (as shown in FIGS. 3B, 4B and 5B) which may be operated from either side of the closure member 2 and has a single rotary driving bit 52 centrally positioned with respect to the key cylinder 52. However, other kinds of key cylinder 51 (e.g. a key-in-knob cylinder) are known to the skilled person and may also be used in the latch bolt assembly.

Figure 8A:
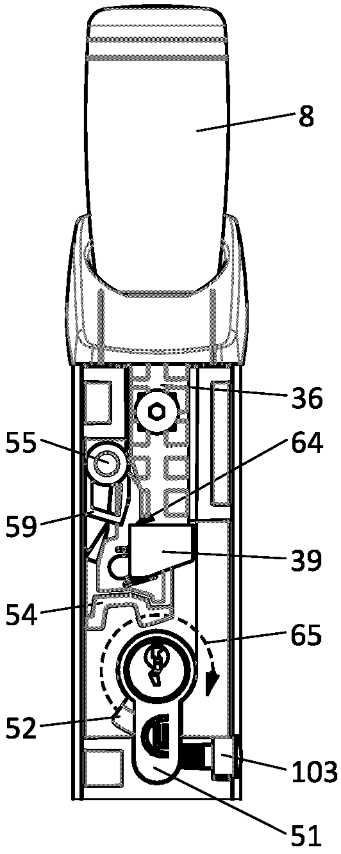
FIGS. 8A to 8C show the same configuration as FIGS. 7A to 7C with a front view.
Figure 8B:
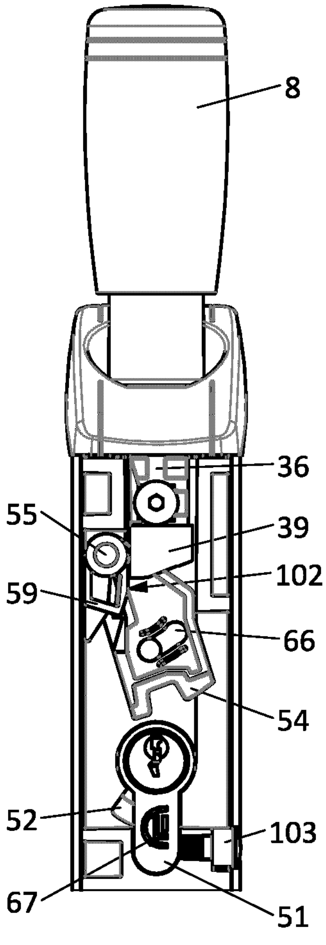
Figure 8C:
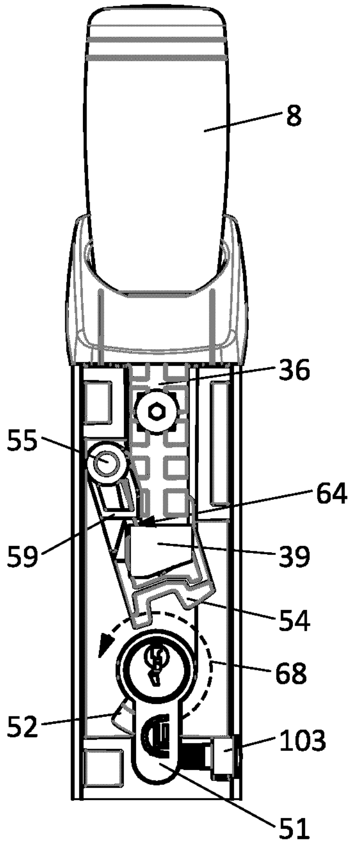

The key cylinder 51 is fixed to the frame 32 by a transversely positioned bolt 103 shown in FIGS. 8A to 8C. The key cylinder 51 is placed centrally with respect to the housing 7 of the latch bolt assembly 5. This central placement is possible due to the specific shape of the upper link rod 33. More specifically, the bottom part 37 of the upper link rod 33 has two parallel legs 37*c*, 37*d* with a groove 53 provided therebetween. The key cylinder 51 extends through this groove 53 and the groove 53 is substantially elongated to allow the bottom part 37 of the upper link rod 33 to slide with respect to the frame 32 as required for the normal operation of the latch bolt operating mechanism described above. Furthermore, the bottom part 37 of the upper link rod 33 is positioned more closely to the frame 32 with respect to the top part 36 of the upper link rod 33. This provides the required space for the rotary driving bit 52 of the key cylinder 51 which may freely rotate adjacent to the bottom part 37 of the upper link rod 33. An alternative would be to make the groove 37 wider to allow a rotation of the rotary driving bit 52. In this way, the top part 36 and the bottom part 37 of the upper link rod 33 may be placed in the same plane, however this increases the width of the latch bolt assembly 5, meaning that the latch bolt assembly 5 is quite bulky and has to be wider than the support 4 which is undesired.

The locking mechanism comprises a pawl locking member 54 that is mounted on the frame 32 by a transverse pin 55 that is placed through an opening 56 in the frame 32, an opening 57 in the pawl locking member 54 and into a hole (not shown) provided in the frame 32. The pin 55 forms a pivot around which the pawl locking member 54 is rotatable between a first position (shown in FIGS. 7A and 8A) and a second position (shown in FIGS. 7B, 7C, 8B and 8C). The pawl locking member 54 is guided between its two positions by means of a curved slot 66 and a cooperating pin 67 (shown in FIG. 8B). The pin 67 is fixed to the frame 32 and movement of the pawl locking member 54 beyond its two positions is prevented as the pin 67 engages the ends of the slot 66. The bottom part of the pawl locking member 54 has a groove 58 formed by two sidewalls 58*a*, 58*b* in a shape corresponding to that of the rotary driving bit 52.

Figure 10:
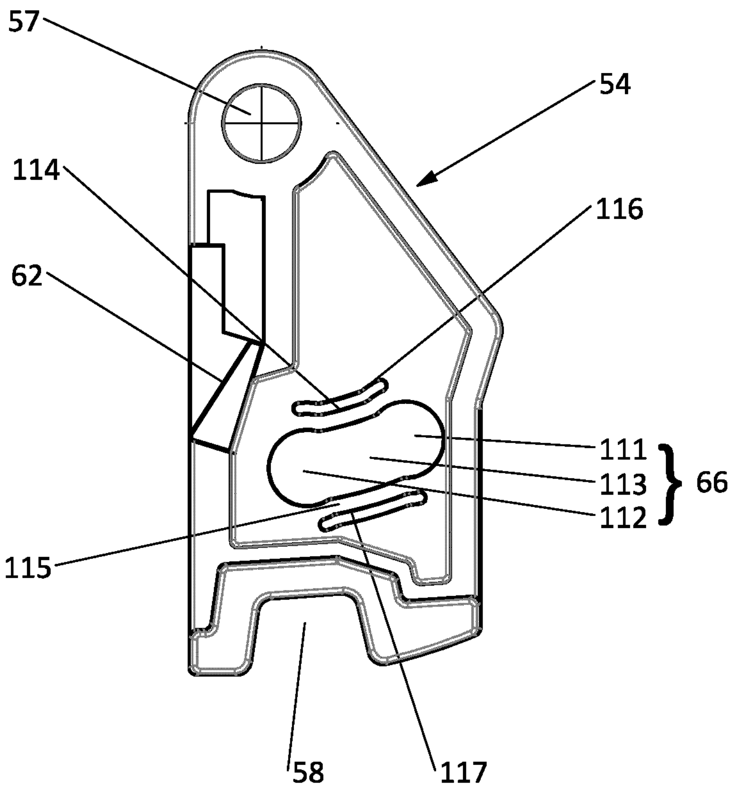
FIG. 10 shows a front view of the pawl locking member.

The shape of the slot 66 is best illustrated in FIG. 10 which shows a front view of the pawl locking member 54. The groove 66 has a specific shape with a narrower central part 113 and larger (compared to the central part 113) end regions 111, 112. The narrower central part 113 is caused by inwardly positioned ridges 114, 115. Besides these ridges 114, 115, there is provided a groove or opening 116, 117 in the pawl locking member 54. More generally, the groove or opening 116, 117 may be formed by a local weakening of the pawl locking member 54 in order to allow the ridges 114, 115 to be displaced outwards due to the pin 67 moving between the end regions 111, 112 upon actuation of the key cylinder 51. The ridges 114, 115 are resilient and urge the pin 67 to either one of the end regions 111, 112. As such, the specific shape forms a bi-stable pawl locking member 54.

The locking mechanism further comprises a pawl 59 that is mounted on the pawl locking member 54. More specifically, the pawl 59 has an opening 60 with the pin 55 also being placed through this opening 60 to mount the pawl 59 to the pawl locking member 54 and the frame 32. The pin 55 thus also forms a pivot around which the pawl 59 is able to rotate between a rest position with respect to the pawl locking member 54 (shown in FIGS. 7A, 7C, 8A and 8C) and a displaced position with respect to the pawl locking member 54 (shown in FIGS. 7B and 8B). The pawl locking member 54 is provided with an abutment 62 which defines the rest position of the pawl 59, i.e. in the rest position the pawl 59 abuts against the abutment 62 provided on the pawl locking member 54. A spring 61 is disposed between the pawl locking member 54 and the pawl 59 in order to urge the pawl 59 into its rest position with respect to the pawl locking member 54, i.e. pushing the pawl 59 against the abutment 62. The spring 61 is a torsion spring having a first end 61*a* that engages the pawl locking member 54 and a second end 61*b* that engages the pawl 59. The pawl 59 further comprises an abutment surface 63 against which the top surface 64 of the horizontal plate 39 (which is part of the upper link rod 33) may abut.

Figure 7A:
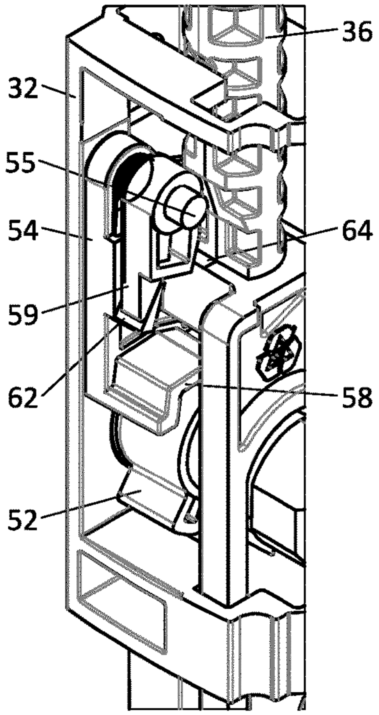
FIG. 7A shows a perspective view of the top part of the latch bolt assembly of FIG. 2 with the housing having been removed, with the locking mechanism in its unlocking position and with the knob in its rest position.

The locking mechanism operates in the following way. When the key cylinder 51 is unlocked (as shown in FIGS. 7A and 8A), the pawl 59 is in its rest position with respect to the pawl locking member 54 which itself is located in its first position. The abutment surface 63 of the pawl 59 is positioned next to the top surface 64 of the horizontal plate 39 which is part of the upper link rod 33. As such, the pawl 59 is in its retracted position and normal operation (i.e. an upwards translation upon pulling the knob 8) of the upper link member 33 is possible as shown in FIGS. 7A and 8A. For this reason, the first position of the pawl locking member 54 is also referred to as the locking position since the pawl 59 is locked in its retracted position with respect to the upper link member 33 and normal operation is allowed. Actuating the key cylinder 51 causes a rotation of the rotary driving bit 52 in a locking direction 65 (indicated in FIG. 8A) and causes the pawl locking member 54 to be rotated towards its second position. The pawl 59 remains stationary with respect to the pawl locking member 54 and thus remains in its rest position. The abutment surface 63 of the pawl 59 is positioned above the top surface 64 of the horizontal plate 39 which is part of the upper link rod 33. As such, the pawl 59 is in its extended position and normal operation (i.e. an upwards translation upon pulling the knob 8) of the upper link member 33 is prevented as shown in FIGS. 7C and 8C. Actuating the key cylinder 51 causes a rotation of the rotary driving bit 52 in a unlocking direction 68 (indicated in FIG. 8C) and causes the pawl locking member 54 to be rotated towards its first position shown in FIG. 8A thereby again allowing normal operation.

Figure 7B:
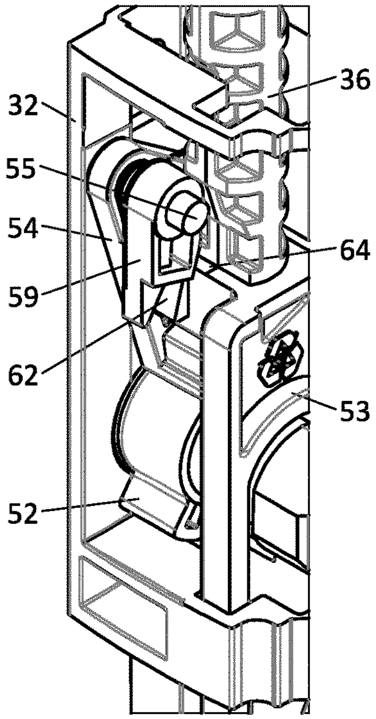
FIG. 7B shows a similar view as FIG. 7A but with the locking mechanism in its locking position and with the knob between its actuated and its rest position.
Figure 7C:
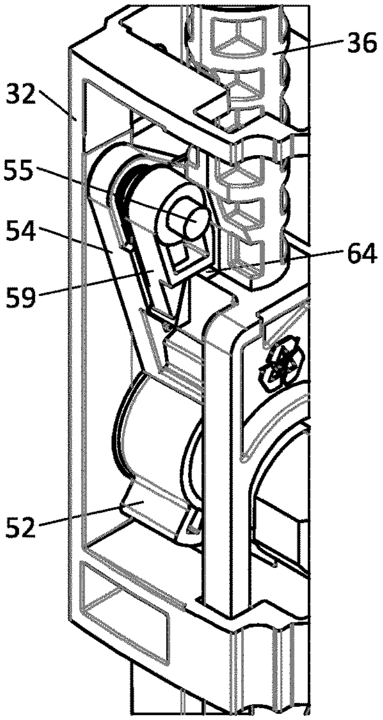
FIG. 7C shows a similar view as FIG. 7B but with the locking mechanism in its locking position and with the knob in its rest position.

The main advantage of the pawl 59 and the pawl locking member 54 is to avoid blocking the knob 8 in the actuated (i.e. upwards) position when the key cylinder 51 is actuated while the knob 8 is kept upwards by the user as illustrated in FIGS. 7B and 8B. More specifically, in case the knob 8 is pulled upwards (i.e. the upper link rod 33 is in an upwards position) and the key cylinder 51 is actuated to move the pawl locking member 54 to its second position, a pawl that is fixed on the pawl locking member 54 would prevent the knob 8 being pulled downwards by gravity to its rest position. However, as the pawl 59 is rotatable with respect to the pawl locking member 54, the downwards motion of the knob 8 and the upper link rod 33 (i.e. the horizontal plate 39) pushes the pawl 59 (in particular against the side surface 102 of the pawl 59) to the side (i.e. against the spring 61). Once the horizontal plate 39 has passed the pawl 59, the spring 61 pushes the pawl 59 against the abutment surface 62 on the pawl locking member 54 to its locking position illustrated in FIGS. 7C and 8C. For this reason, the second position of the pawl locking member 54 is also referred to as the release position since the pawl 59 is released and is free to be moved from its extended to its retracted position by the downwards motion of the knob 8.

It will be appreciated that variations of the construction of the pawl 59 and/or the pawl locking member 54 are possible. For example, the spring 61 may be interposed between the pawl 59 and the frame 62, the pawl 59 and/or the pawl locking member 54 may undergo a translational motion instead of a rotary motion, the pawl 59 and the pawl locking member 54 may be mounted on different rotational axes, the pawl 59 may engage another part of the upper link rod 33, etc.

It will be readily appreciated that various modifications are possible in which the advantages of the second-order lever between the link rods 33, 34 and/or of the locking mechanism are also obtained. For example, in an embodiment, the magnetic roles of the latch bolt 14 and the magnet 19 are reversed. In other words, the latch bolt 14 is a permanent magnet and element 19 is made from a ferromagnetic material (e.g. iron). The operation of the magnetic latch assembly 1 remains unaffected because the latch bolt 14 will still be attracted to the element 19 as this is fixedly positioned within the keeper assembly 6. Moreover, it is also possible that the latch bolt 14 and the magnet 19 are permanent magnets and/or electromagnets. In another embodiment, the latch bolt 14, coupler 15 and latch bolt spring 17 are replaced by a magnetic element fixed to the lower end 34*a* of the lower link rod 34. The keeper assembly 6 is replaced by a latch bolt assembly having a horizontally oriented latch bolt that is biased towards its retracted position and is attracted by the magnetic element fixed to the lower end 34*a*. Such embodiments are disclosed in AU 2009/251007 A1, AU 2013/206766 A1, 2014/203446 A1, AU 2016/201778 A1, and AU 2018/256525 A1. Furthermore, it is also possible to reverse the roles of the magnet and the latch bolt in such an embodiment, i.e. have the horizontal latch bolt form the permanent magnet and have a ferromagnetic material fixed to the lower end 34*a* of the lower link rod 34. Moreover, the position of the latch bolt assembly 5 and the keeper assembly 6 may also be reversed, i.e. the latch bolt assembly may be mounted on the closure member 2 and the keeper assembly 6 on the support 4.

A second embodiment of a magnetic latch assembly 1' will be described with reference to FIGS. 11A to 18. Elements in the magnetic latch assembly 1' will be indicated with the same reference numbers as corresponding elements in the magnetic latch assembly 1. The magnetic latch assembly 1' is mounted on a closure system. The closure system comprises a closure member 2 that is hinged on a first support 3 and that may be fastened to a second support 4 by means of the magnetic latch assembly 1. In the illustrated embodiment, the closure member 2 is formed by a gate and the supports 3, 4 are formed by fixed 1', but it will be readily appreciated that the magnetic latch assembly 1' is also suitable for other kinds of closure members (e.g. a sliding closure member, a door, etc.) and/or supports. For example, the support may be formed by a closure member in case the magnetic latch assembly 1' is used on a double gate.

Figure 11A:
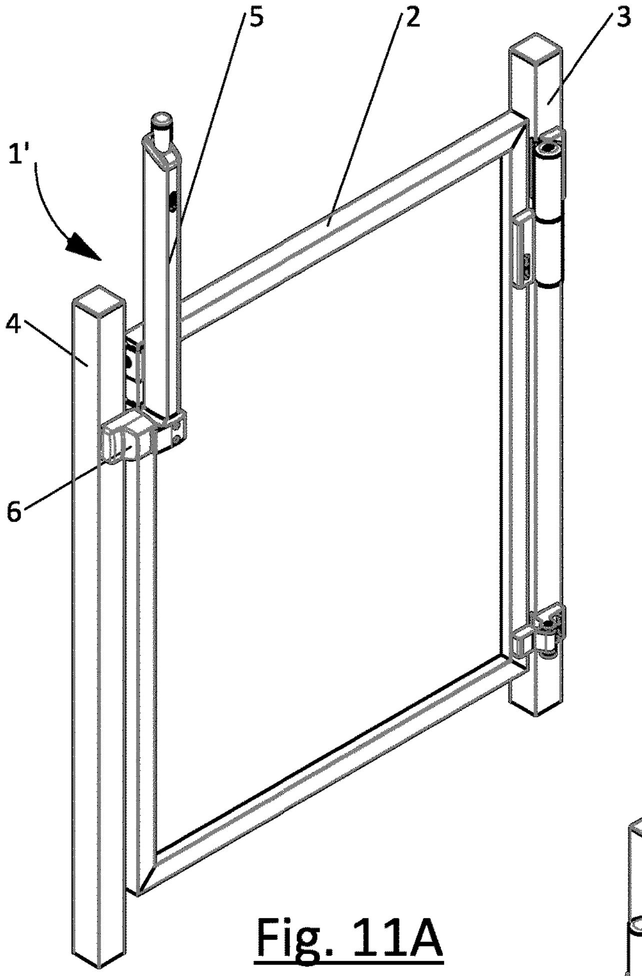
FIGS. 11A and 11B show a perspective view of an embodiment of a magnetic latch assembly mounted on a right-handed, respectively left-handed, closure system.
Figure 11B:
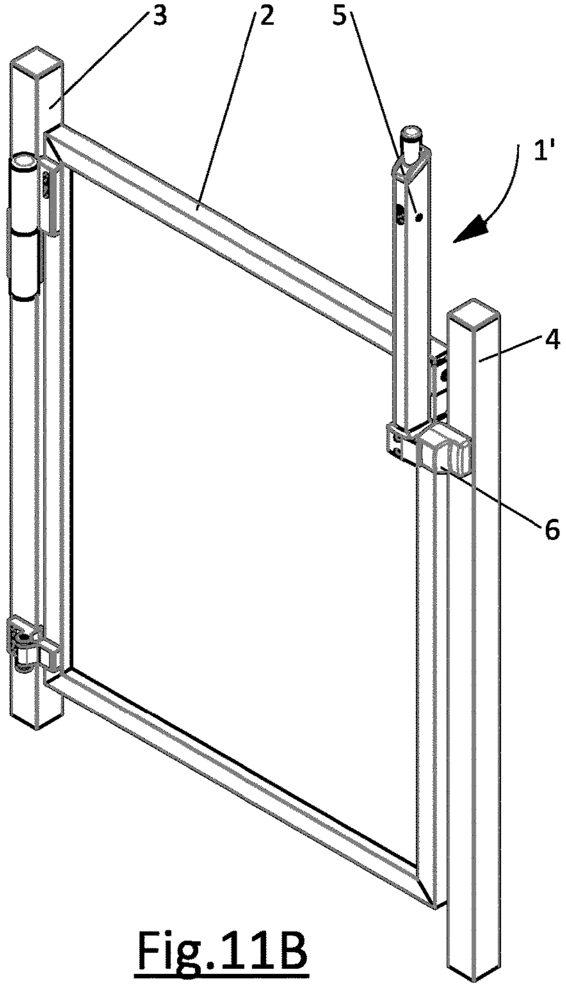

The magnetic latch assembly 1' generally comprises a latch bolt assembly 5 and a magnetic keeper assembly 6 as shown in FIGS. 11A and 11B. In the illustrated embodiment, the latch bolt assembly 5 is mounted on the closure member 2 and the magnetic keeper assembly 6 is mounted on the support 4, but it will be readily appreciated that these may be reversed. The latch bolt assembly 5 comprises a vertically oriented elongated housing 7 with a pull knob 8 protruding from the top thereof. The major difference between the magnetic latch assemblies 1, 1' are the components in the bottom part of the housing 7 and underneath the housing 7. More specifically, the magnetic latch assemblies 1, 1' are identical for all upper components in the housing 7, i.e. ell components from the knob 8 downwards to and including the lower link rod 34 are identical and will not be described again. However, while the magnetic latch assembly 1 had a vertically oriented latch bolt 14 protruding from the bottom of the housing 7 and an L-shaped bracket 10 underneath the elongated housing 7, the magnetic latch assembly 1' is provided with a second housing 70 underneath the elongated housing 7 in which a horizontally oriented latch bolt 14 is placed. The latch bolt 14 is moveable along a horizontal translational motion between a retracted position (shown in FIG. 14A) and a latching position (shown in FIG. 14B) in which the latch bolt 14 protrudes from the side wall 72 of the housing 70. It will be readily appreciated that the elongated housing 7 and the bottom housing 70 together may be regarded as a frame on which the various components of the latch bolt assembly are mounted.

Figure 12A:
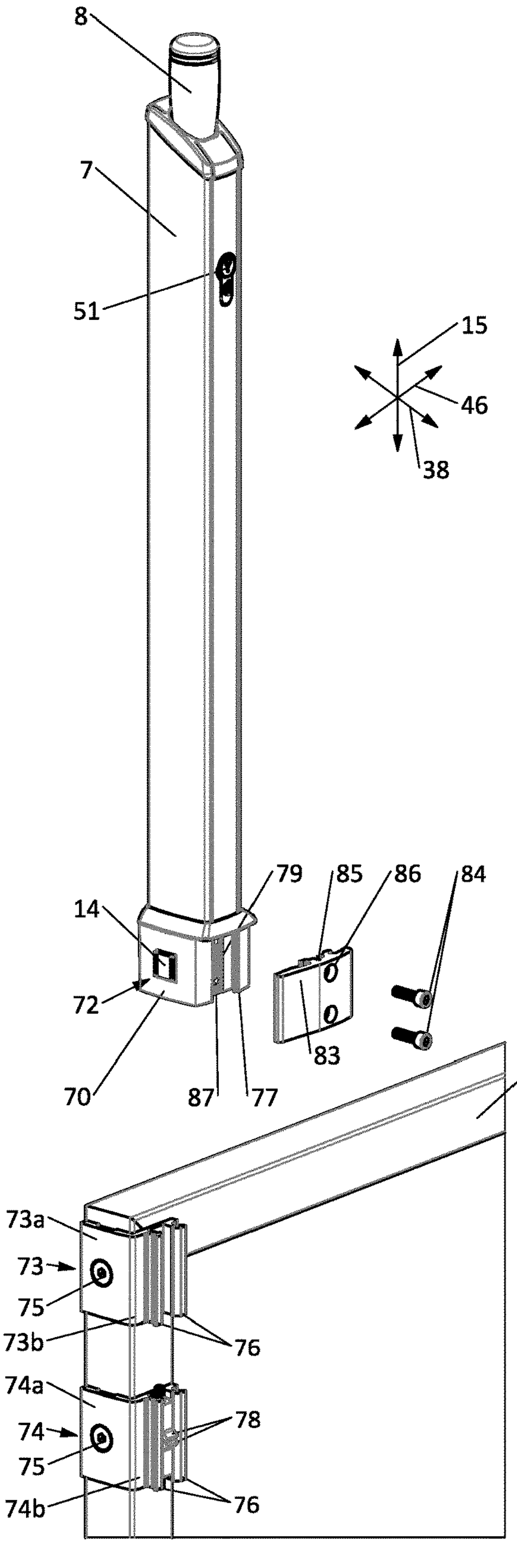
FIGS. 12A and 12B show a perspective view of mounting the latch bolt assembly of the magnetic latch assembly of FIGS. 11A and 11B on a right-handed, respectively left-handed, hinged closure member.
Figure 12B:
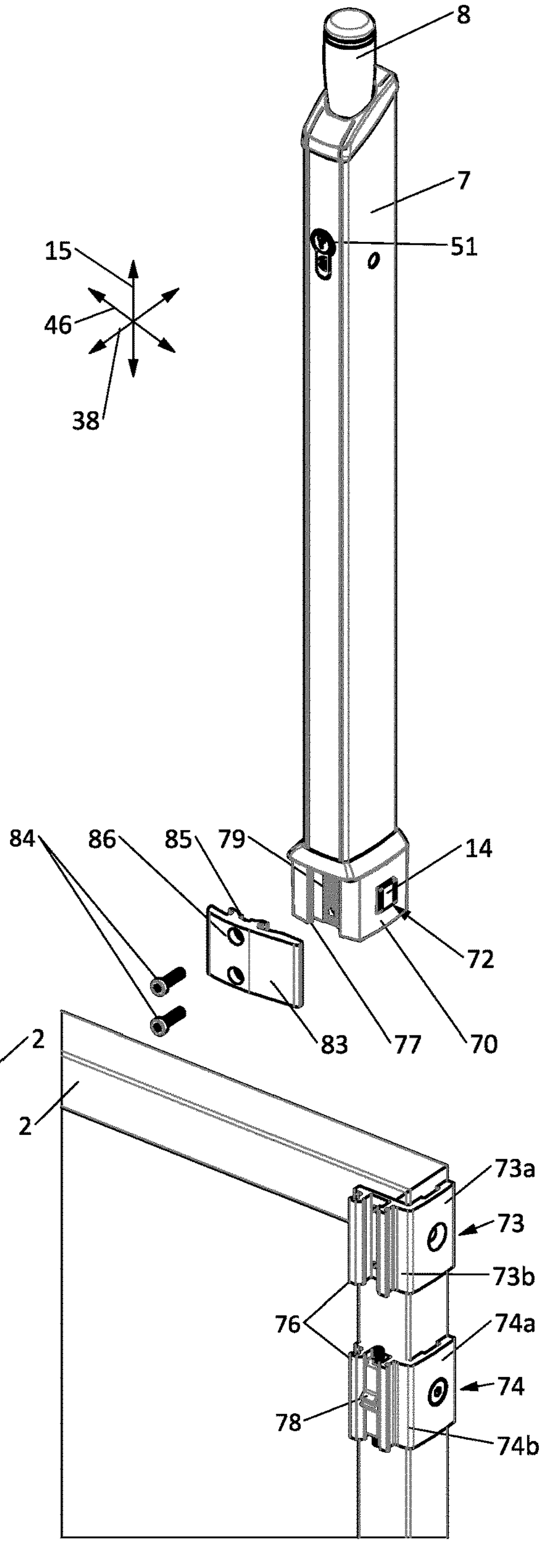

Due to the horizontal placement of the latch bolt 14, the magnetic latch assembly 1' has different configurations for a right-handed closure member 2 (shown in FIGS. 11A and 12A) and for a left-handed closure member 2 (shown in FIGS. 11B and 12B). More specifically, the elongated housing 70 is always fixed in the same position with respect to the closure member 2, while the lower housing 70 together with its internal components is rotatable over 180° about the vertical direction 15 with respect to the elongated housing 7 as described in more detail below by reference to FIGS. 16 to 18. In this way, the side wall 72 from which the latch bolt 14 protrudes in its latched state is differently positioned with respect to the elongated housing 7 depending on the handedness of the closure member 2. The lower housing 70 positioning is done prior to mounting the latch bolt assembly 5 on the closure member 2.

The latch bolt assembly 5 is mounted on the closure member 2 as best illustrated in FIGS. 12A and 12B. In particular, the latch bolt assembly 5 is mounted on the closure member 2 by means of an upper L-shaped mounting bracket 73 and a lower L-shaped mounting bracket 74. The L-shaped mounting brackets 73, 74 have a first leg 73*a*, 74*a* that is fixed by a bolt 75 to the side of the closure member 2 and a second leg 73*b*, 74*b* on which two guide rails 76 are provided. The frame 7, 70 has corresponding guides that fit in the guide rails 76 to allow mounting the latch bolt assembly 5 by sliding it along the vertical direction 15. More specifically, the elongated housing 7 is provided with corresponding guides 112 (shown in FIGS. 17A and 17B) in its rear wall, while the housing 70 has corresponding guides 77 on both its front and rear side (i.e. the front and rear side are symmetrical), which sides change positions depending on the handedness of the closure member 2.

Figure 19:
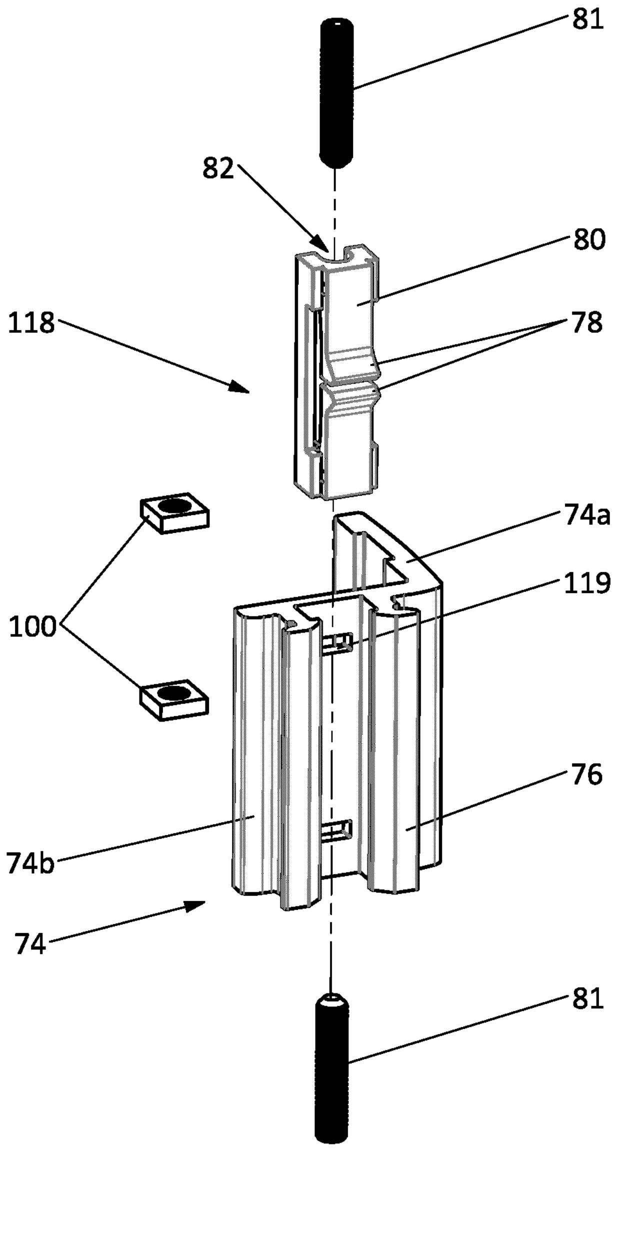
FIG. 19 shows an exploded view of the bottom mounting bracket used in the height adjustment mechanism.

In order to fix the vertical position of the latch bolt assembly 5 with respect to the closure member 2, the second leg 74*b* of the lower L-shaped bracket 74 is provided with two projections 78 that fit into one of a set of parallel grooves 79 provided on the housing 70. This is shown in detail in FIGS. 13A and 19. The projections 78 are mounted on arms 80 that form part of a fixation element 118 that is fixed to the second leg 74*b* of the L-shaped bracket 74. More specifically, the fixation element 118 fits in the guides 76 on the second leg 74*b* of the L-shaped bracket 74 so that the fixation element 118 is fixed in the horizontal plane (i.e. the width direction 46 and the depth direction 38) with respect to the L-shaped bracket 74. A vertical displacement of the fixation element 118 with respect to the L-shaped bracket 74 is avoided by the square nut elements 100 which are inserted through corresponding openings 119 in the second leg 74*b* into corresponding grooves (best shown in FIG. 13A) in the fixation element 118. A through-hole 82 that extends in the vertical direction 15 is present between the fixation element 118 and the second leg 74*b* of the L-shaped bracket 74 the L-shaped bracket 74. Two set screws 81 are provided in the through-hole 82 which extend through a corresponding square nut element 100, each set screw 81 being individually adjustable (e.g. by using a hex key or the like). The L-shaped bracket 74 is usually made from metal (e.g. aluminium), while the fixation element 118 is usually injection moulded from a polymeric material (e.g. polyamide, in particular fibre-reinforced polyamide, or the like). The square nut elements 118 also ensure that any vertical forces exerted on the fixation element 118 (i.e. on the projections 78) are directly transmitted to the metal L-shaped bracket 74.

Figure 20:
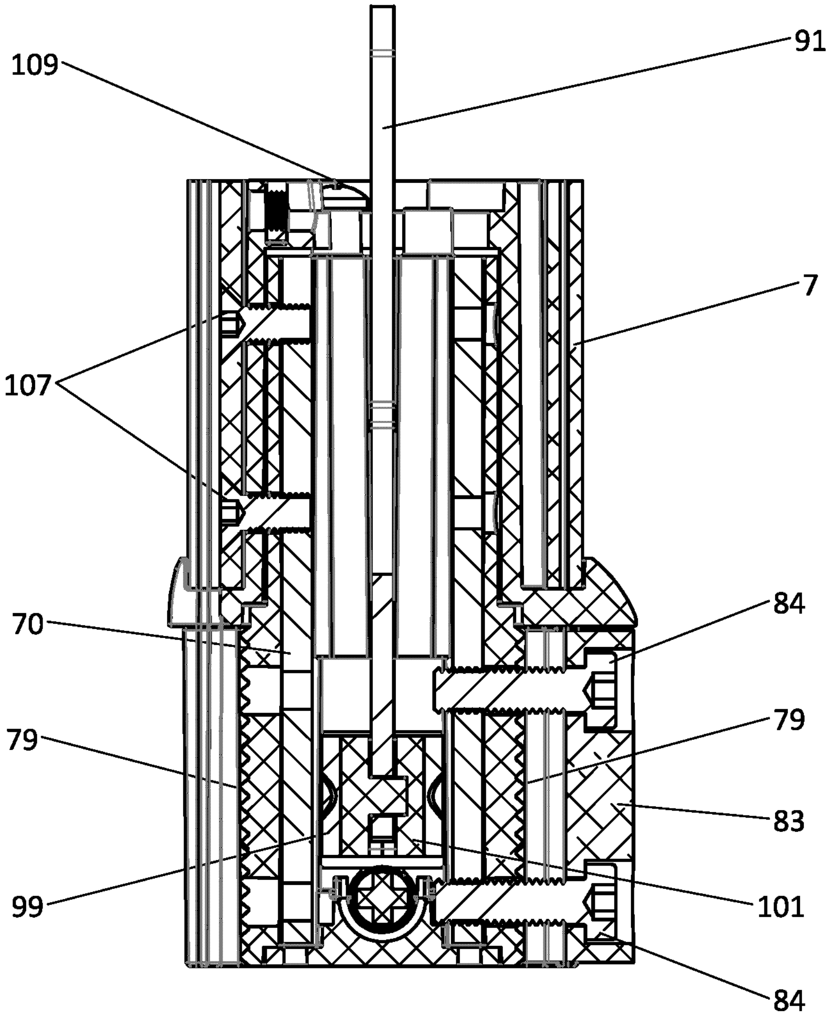
FIG. 20 shows a longitudinal cross-section through part of the latch bolt assembly of FIGS. 11A and 11B.

By rotating the set screws 81 closer together, the protrusions 78 are urged away from the second leg 74*b* of the lower L-shaped bracket 74 and towards the parallel grooves 79 provided on the housing 70. More specifically, one of (the upper one in FIG. 13A) the opposing end faces 126*a* of the set screws 81 acts as an engagement surface which engages the protrusions 78 and pushes them away from the L-shaped bracket 74. In this way, each protrusion 78 interlocks with a groove from the parallel grooves 79 thus preventing a further vertical motion of the housing 70 with respect to the lower L-shaped bracket 74. In other words, the vertical position of the latch bolt assembly 5 with respect to the closure member 2 is fixed. Since a plurality of parallel grooves 79 are provided on the housing 70, the vertical position of the latch bolt assembly 5 with respect to the closure member 2 may be adjusted by loosening (one or both of) the set screws 81 and moving the frame 7, 70 before again fastening the set screws 81. Due to the different possible rotational positions of the lower housing 70 with respect to the elongated housing 7, grooves 79 are provided on both sides of the lower housing 70 as shown in FIG. 20.

The use of two set screws 81 and two projections 78 is beneficial as it allows to operate the adjustment mechanism from either the upper side or the lower side of the lower L-shaped bracket 74. This is particularly advantageous since the lower L-shaped bracket 74 is mounted in two different vertical orientations depending on the handedness of the closure member 2 since the first leg 74*a* of the lower L-shaped bracket 74 is to be positioned between the closure member 2 and the support 4. Moreover, once the latch bolt assembly 5 is placed on the L-shaped brackets 73, 74, it is very difficult to reach and rotate the upper set screw 81. As such, depending on the handedness of the closure member 2, only one of the set screws 81 (i.e. the lower one) is rotated to cause the protrusions 78 to engage the grooves 79. Furthermore, the use of two projections 78 provides a stronger connection when compared to a single projection 78. Two arms 80 is also beneficial as this results in a latch bolt assembly 5 that is always hanging from one arm (i.e. the upper one) and pushing on the other arm (i.e. the lower one), while, in case of only a single arm, the latch bolt assembly 5 is either hanging or pushing depending on the orientation. Depending on the tensile strength and/or the compressive strength of the fixation element 118 which is mainly determined by its material (e.g. plastic) properties, the arms 80 may be prone to elongation or compression which could result in a shift in height.

Furthermore, by using two set screws 81, a stop is provided to limit movement of the set screws 81. More specifically, of the two set screws 81, one is stationary and the other one is being rotated to fix the height (which one depends on the vertical orientation of the L-shaped bracket 74). As such, the stationary set screw will act as a stop for the rotatable set screw as the opposing end faces 126*a* engage one another. Another advantage of this is that, as the end faces 126*a* engage one another, a further rotation of one of the set screws 81 urges the nut elements 100 away from one another causing them to be very robustly locked into the openings 119.

In a non-illustrated embodiment, the fixation element 118 is integrally formed with the L-shaped bracket 74. However, such an element is not easily injection moulded. Moreover, as described above, it is beneficial to form the L-shaped bracket from metal to provide the required strength.

Figure 13A:
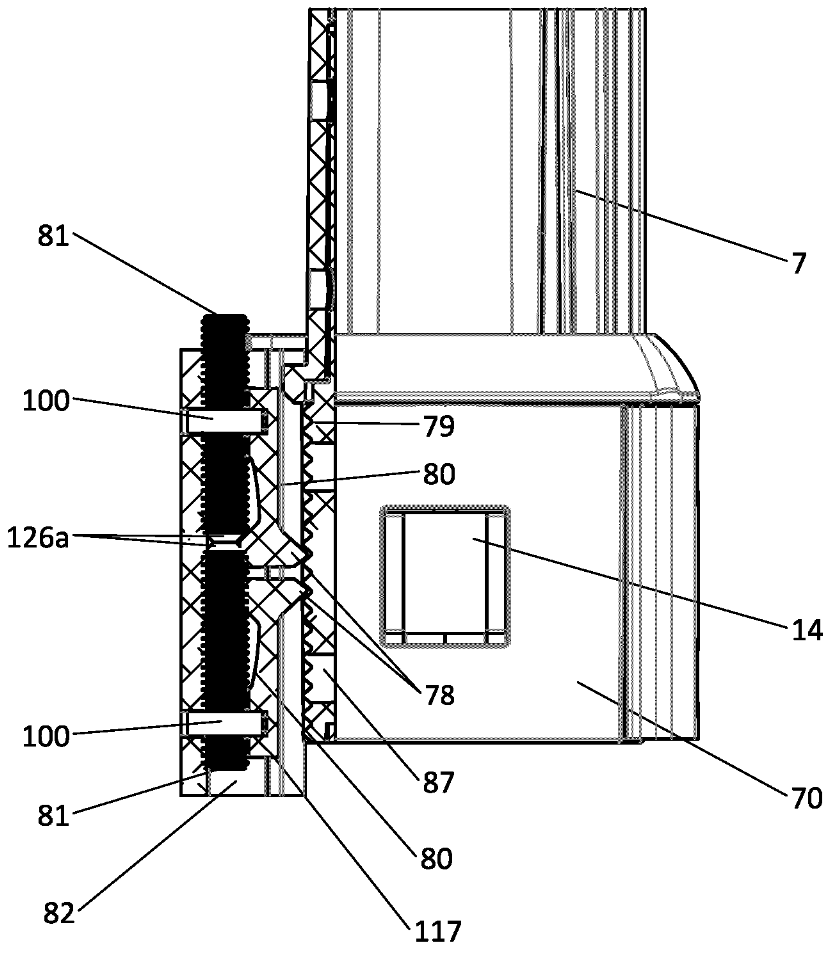
FIG. 13A shows a cross-section through the bottom mounting bracket and partially through the bottom part of the latch bolt assembly of the magnetic latch assembly of FIGS. 11A and 11B illustrating the height adjustment mechanism.
Figure 13B:
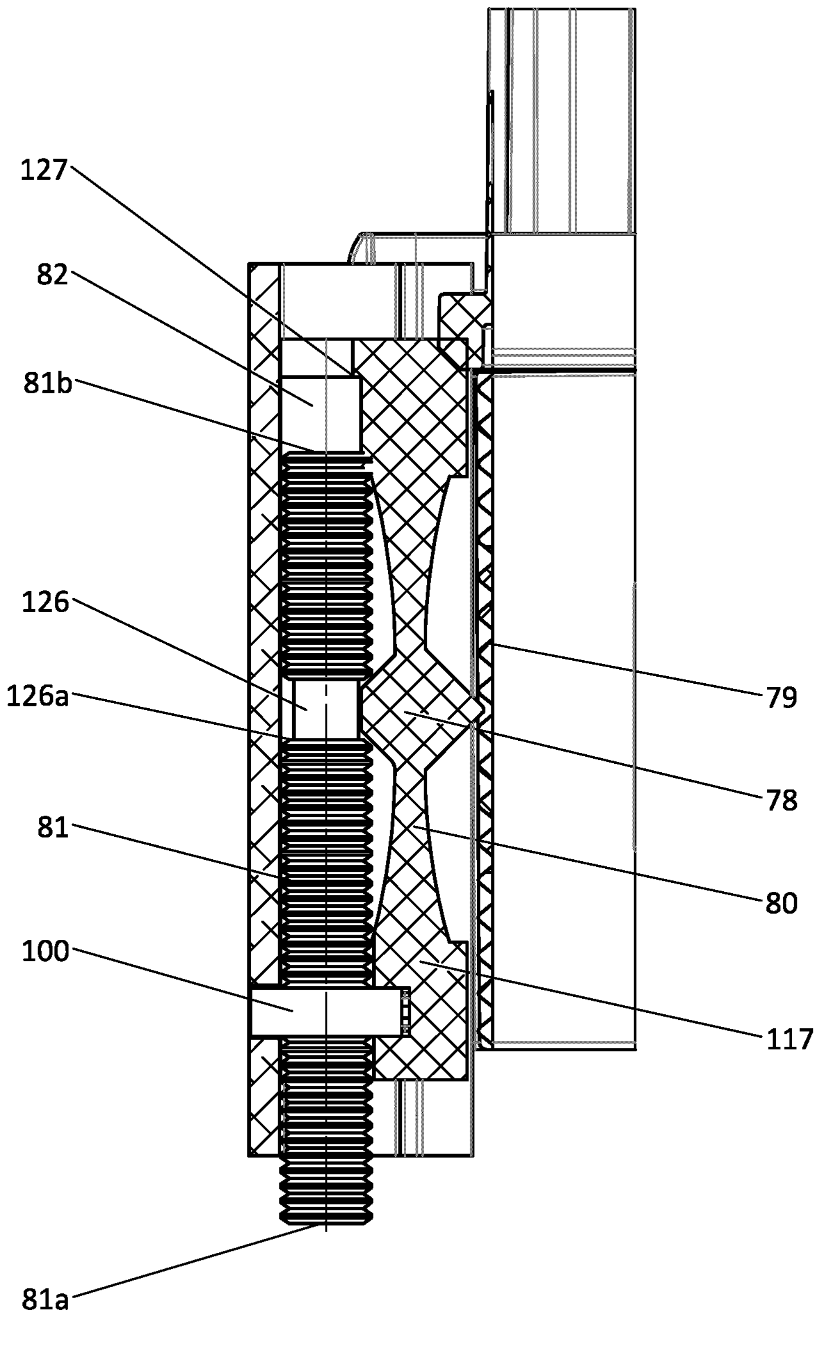
FIG. 13B shows a cross-section through an alternative mounting bracket for mounting the latch bolt assembly of the magnetic latch assembly of FIGS. 11A and 11B.

FIG. 13B illustrates a variation of the height adjustment mechanism shown in FIG. 13A. More specifically, the two set screws are replaced by means of a single elongated partially threaded rod 81 which is rotatable from either end 81*a*, 81*b* (e.g. by means of a hex key or the like). The upper end 81*b* of the threaded rod 81 is accessible via opening 82. The fixation element 118 further comprises a stop 127 near its top which prevents the threaded rod 81 from being rotated too far (the stop could also be formed by an additional bolt, pin or the like to fix the threaded rod in its position after rotation). The threaded rod 81 is connected to the L-shaped bracket 74 by means of a single rectangular nut 100. Another difference is that the two arms are replaced by a single continuous arm which is fixed to the fixation element 118 at both ends and has a single central protrusion 79. The continuous arm 80 is flexible and can be bent away from the L-shaped bracket 74. The threaded rod comprises a central area 126 with a decreased diameter which corresponds to the location of the protrusion 79. B rotating the threaded rod 81, the decreased diameter part 126 moves upwards so that the lower wall 126*a* engages the protrusion urging the protrusion towards the grooves 79. By mounting the protrusion 79 on a continuous arm 80 still avoids a shift in height that could occur in case the protrusion 79 is only connected to the fixation element 117 by means of single arm as this arm may be prone to elongation or compression depending on its tensile/compression strength.

As shown in FIGS. 12A and 12B, the housing 70 is also provided with a stop 83 that is mounted on the front side of the housing 70. In particular, the stop 83 includes guides 85 corresponding to the guides 77 on the housing 70, which guides 77 are used to engage the lower L-shaped bracket 74. The stop 83 is slid upwards and is fixed by means of bolts 84 that extend through openings 86 in the stop 83 and fit in holes 87 in the housing 70.

The internal structure of the lower housing 70 and the additional components of the latch bolt operating mechanism will be described with respect to FIG. 14A to 15. As described above, all components of the magnetic latch assembly 1' from the knob 8 to the lower link rod 34 are identical to those in the magnetic latch assembly 1. However, where the latch bolt 14 is positioned directly on the slideable coupler 15 which engages the lower link rod 34 in the magnetic latch assembly 1, an additional puller 88 is present in the magnetic latch assembly 1'. The puller 88 is connected at its upper end to the lower link rod 34 in a rotatable fashion as described in more detail below with reference to FIGS. 16 to 18. It will be readily appreciated that, in a non-illustrated embodiment, a coupler 15 may be interposed between the lower link rod 34 and the puller 88. The puller 88 and is moveable by a vertical translational motion between a rest position (shown in FIGS. 14A and 14C) and an actuated position (shown in FIG. 14B). These positions are directly related to the position of the knob 8, i.e. when the knob 8 is in its rest position, the puller 88 is in its rest position and vice versa. The puller 88 has a bevelled surface 89, the function of which is described below.

Figure 14A:
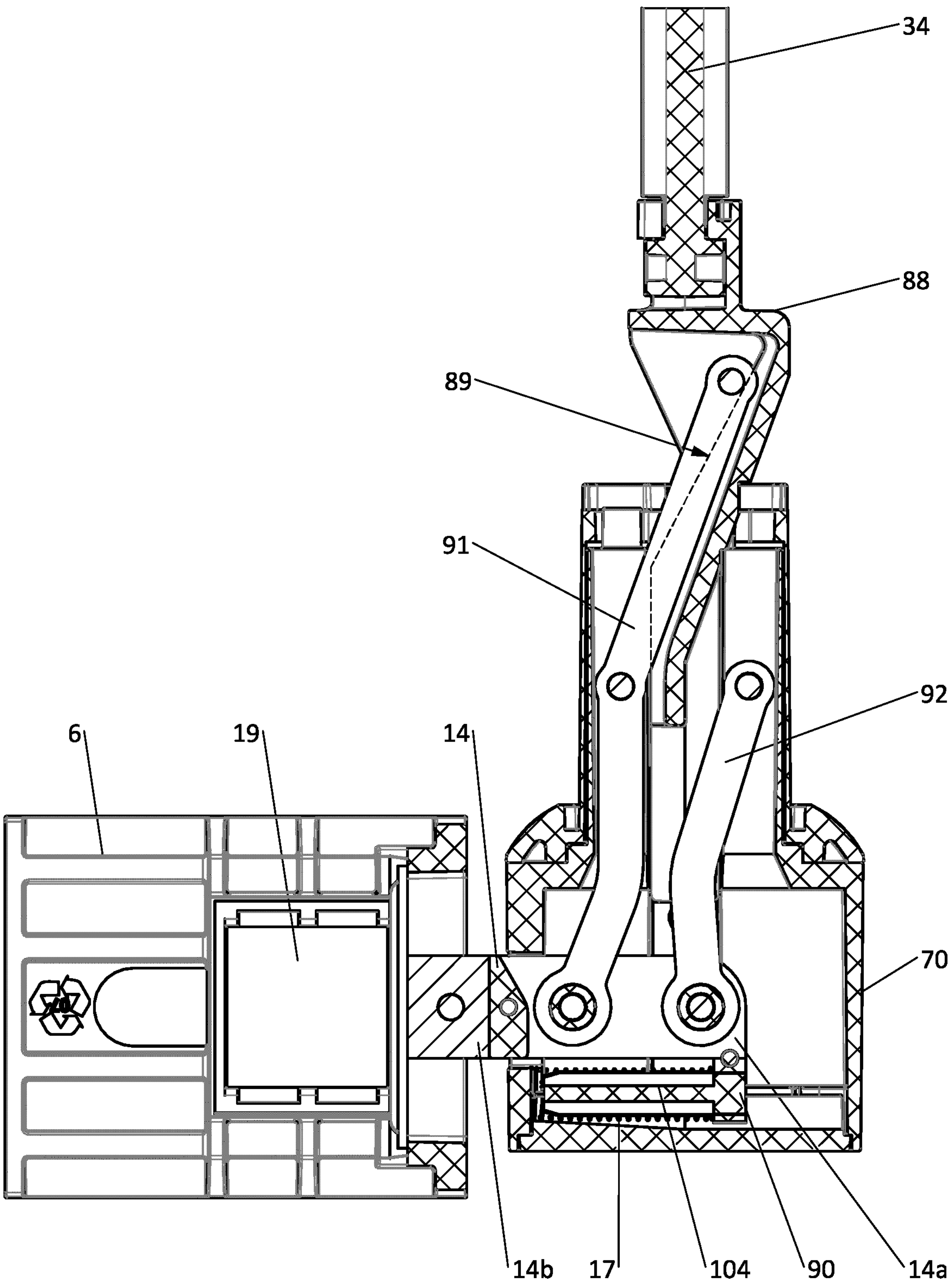
FIG. 14A shows a longitudinal cross-section through the bottom part of the latch bolt assembly of the magnetic latch assembly of FIGS. 11A and 11B in its latching position.
Figure 14B:
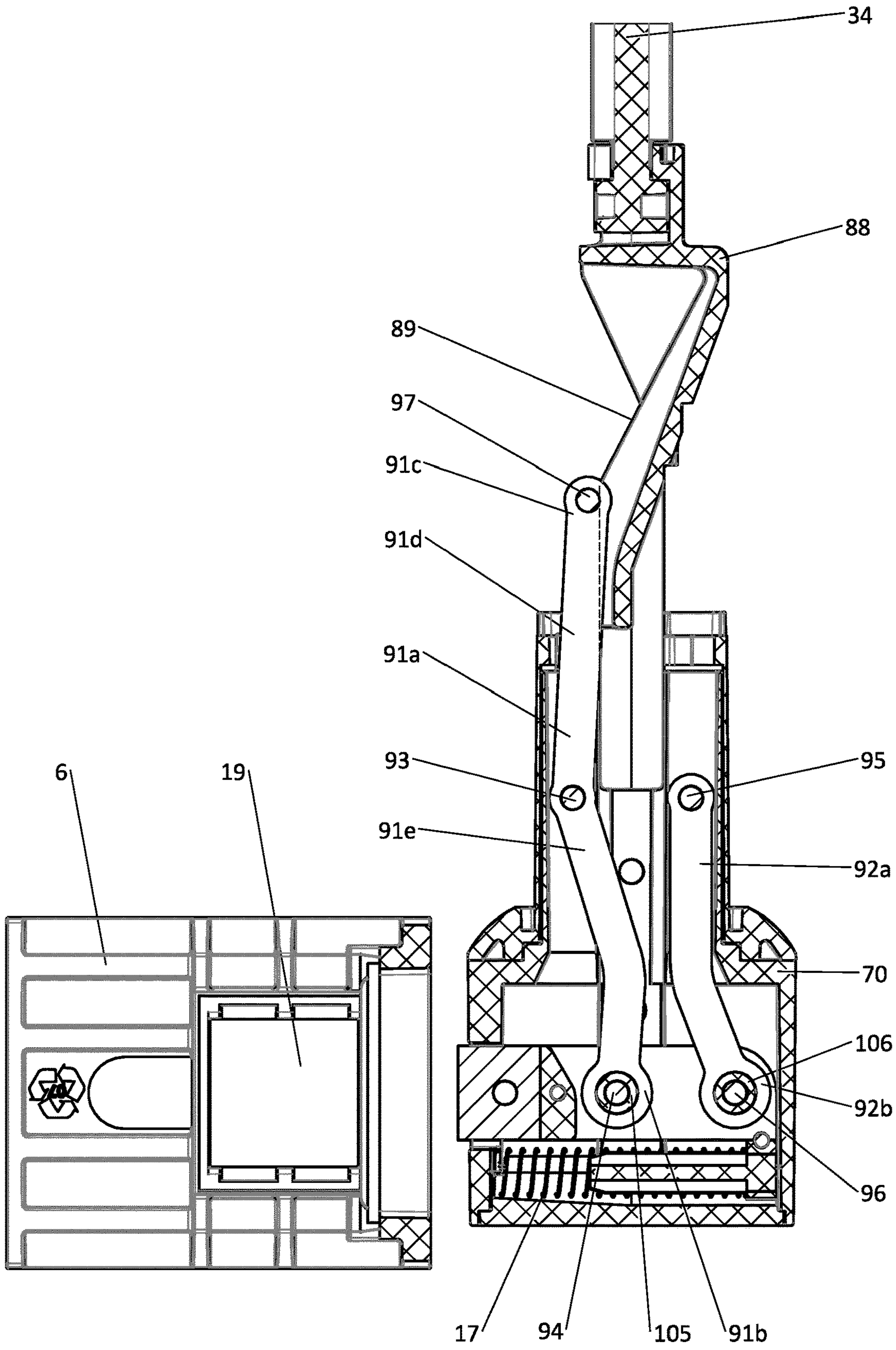
FIG. 14B shows a similar view as FIG. 14A with the knob in its actuated position.
Figure 14C:
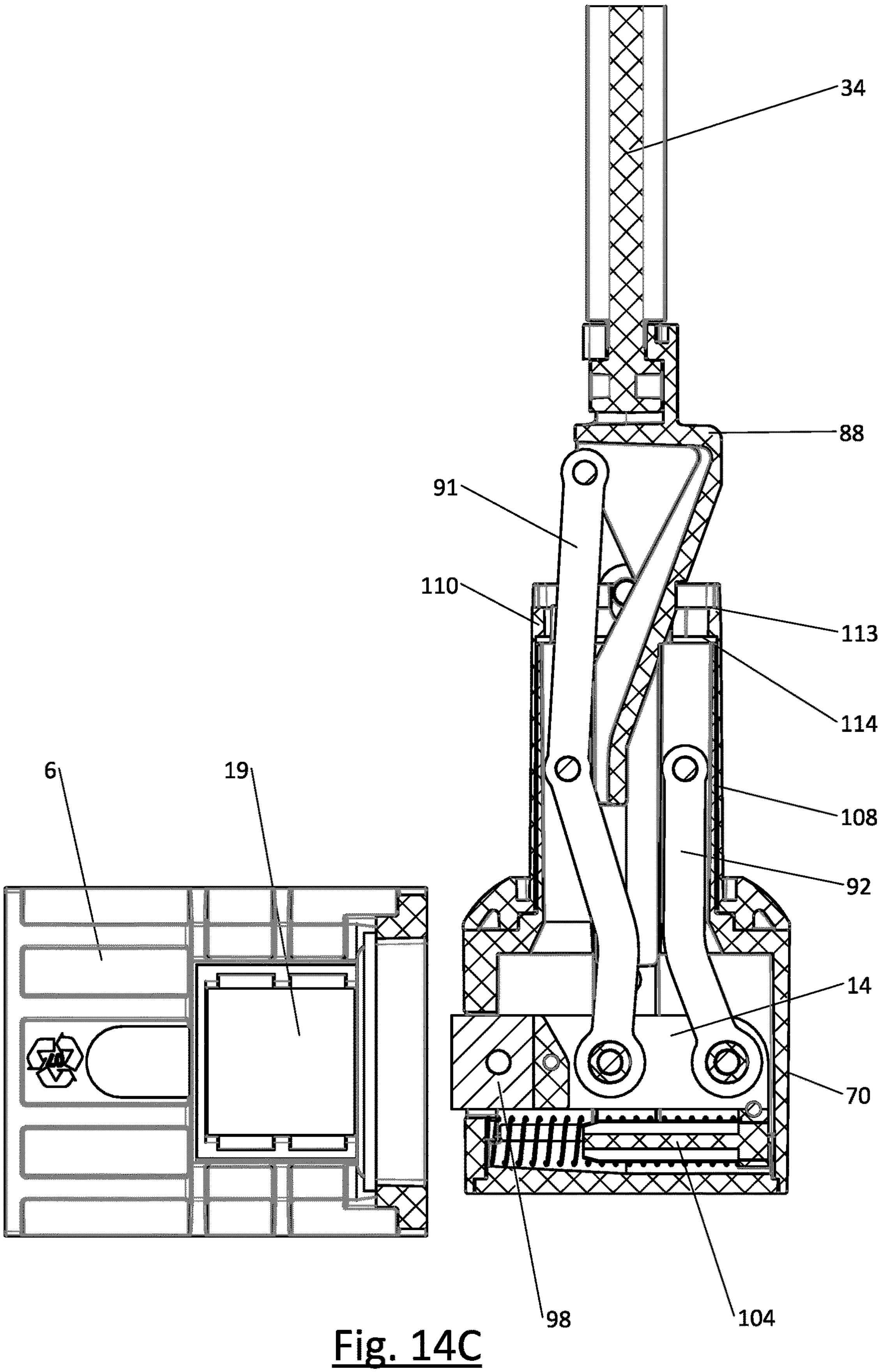
FIG. 14C shows a similar view as FIG. 14A with the knob in its rest position and with the latch bolt in its retracted position.

The latch bolt 14 is positioned horizontally and is moveable between a retracted position (shown in FIGS. 14B and 14C) and a latching position (shown in FIG. 14A). A latch bolt spring 17 is positioned between the housing 70 and the latch bolt 14 in order to urge the latch bolt 14 towards its retracted position. In the illustrated embodiment, the inner end 14*a* of the latch bolt 14 is provided with a protrusion 90 which engages one end of the latch bolt spring 17. On the protrusion 90, there is provided a guiding pin 104 around which the latch bolt spring 17 is positioned. This guiding pin 104 prevents the latch bolt spring 17 from buckling. The latch bolt spring 17 is thus a compression spring in the illustrated embodiment. The keeper assembly 6 is provided with a magnet 19 which magnetically attracts the latch bolt 14 to move the latch bolt 14 against the latch bolt spring 17 towards its latching position. The latch bolt 14 is mounted to (more specifically suspended from) the housing 70 by means of two levers, namely an operation lever 91 and a support lever 92.

The operation lever 91 is pivotally connected to the housing 70 in a central area 91*a* by a transversely positioned pin 93 and is pivotally connected at its lower end 91*b* to the latch bolt 14 by another transversely positioned pin 94. The support lever 92 is fastened in a similar way at its upper end 92*a* to the frame by pin 95 and at its lower end 92*b* to the latch bolt 14 by pin 96. No other guiding and/or support means are required for the latch bolt 14, such that the latch bolt 14 is able to move with nearly no friction. The upper end 91*c* of the operation lever 91 is provided with a transverse pin 97 which engages the puller 88, in particular the bevelled surface 89 thereof. The levers 91, 92 are rotatable about their respective pivot pins 93, 95 between a first position (in which the latch bolt 14 is in its retracted position) and a second position (in which the latch bolt 14 is in its latching position). It will be readily appreciated that the levers 91, 92 may also be used as a latch bolt biasing means instead of and/or additional to the latch bolt spring 17. More specifically, the levers 91, 92 may be designed in order to automatically return to their rest position in which the latch bolt 14 is in its retracted state. As shown in FIGS. 14A to 14C, the latch bolt 14 does not engage the housing 70 in the vertical direction, thus reducing friction.

In order to further reduce possible friction, plastic rings 105, 106 are disposed between the levers 91, 92 and the latch bolt 14. More specifically, a plastic ring 105 is disposed between the transverse pin 94 and the latch bolt core 101 and a plastic ring 106 is disposed between the transverse pin 96 and the latch bolt core 101. Alternatively, the latch bolt core 101 (indicated in FIG. 15) could be made from a plastic material.

Figure 15:
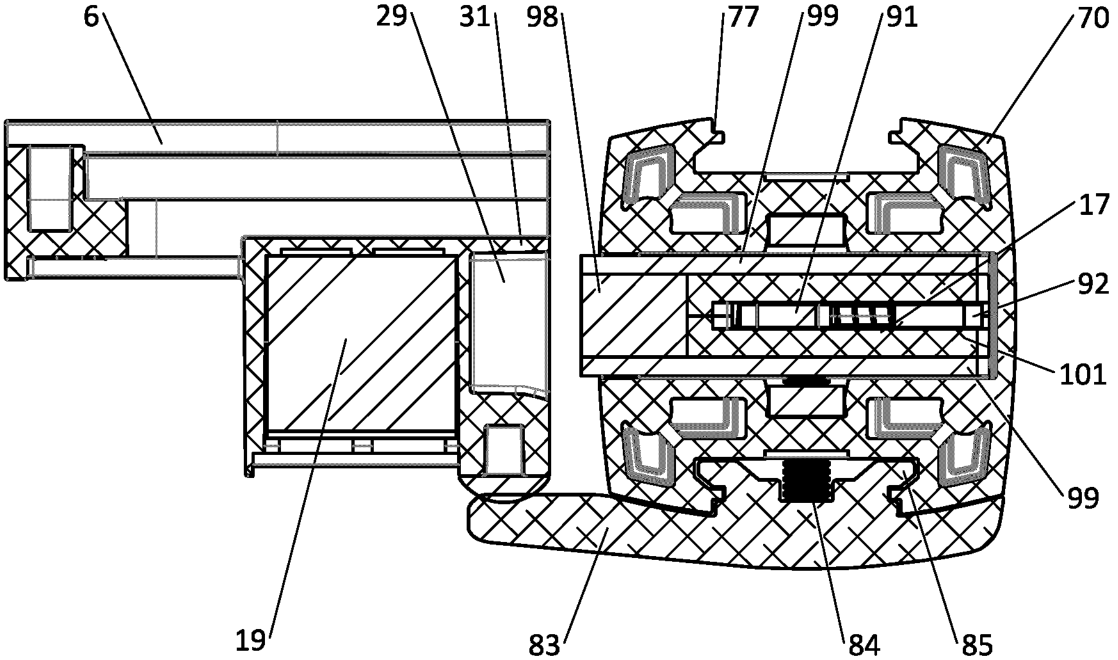
FIG. 15 shows a horizontal cross-section through the latch bolt assembly of FIGS. 11A and 11B.

As best shown in FIG. 15, the latch bolt 14 has a ferromagnetic element 98 that may be attracted by the magnet 19. The ferromagnetic element 98 is preferably located as near to the magnet 19 as possible and is therefore located at the front 14*b* of the latch bolt 14. However, as the latch bolt assembly 5 is meant for outdoor use, a protective surface coating (not shown) is applied to the ferromagnetic element 98 in order to avoid oxidization of the ferromagnetic element 98. However, such coatings are easily damaged due to friction. As such, the ferromagnetic element 98 is flanked by two protective plates 99 that are made from stainless steel or other suitable materials. This avoids sideways damage to the ferromagnetic element 98 in case a sideways force is exerted on the closure member 2 when the latch bolt 14 is in its latched position.

FIG. 15 further illustrates that the latch bolt 14, at least the protective plates 99, slide along the housing 70. In other words, the housing 70 has a central hole (not indicated) in which the latch bolt 14 is suspended. This is beneficial in case the latch bolt 14 is in its latching position within the keeper assembly 6 and a user attempts to force open the closure member 2. More specifically, trying to open the closure member 2 causes the latch bolt 14 to be pushed against the keeper assembly 6 in the width direction (i.e. downwards in FIG. 15). This sideways force on the latch bolt 14 is then directly transferred (via the protective plates 99) to the housing 70 thus avoiding that the force would be exerted on the levers 91, 92. For a similar reason, namely to avoid excess forces on the levers 91, 92, the latch bolt 14 has a rectangular (in particular square) cross section and is disposed in a square opening in the housing 70. In this way, a rotation of the latch bolt 14 around its longitudinal axis is prevented or at least the forces associated therewith are transferred directly to the housing 70 and are not exerted on the levers 91, 92.

In the illustrated embodiment, no coupler 15 is present in the magnetic latch assembly 1'. However, the same functionality (i.e. allowing the knob 8 to be in its rest position with the latch bolt 14 in its retracted position) is included. More specifically, as best shown in FIGS. 14B and 14C, when the latch bolt 14 is in its retracted state, the puller 88 does not engage the operation lever 91 or the support lever 92 irrespective of the position of the puller 88. In other words, the puller 88 is free to move from its actuated state (shown in FIG. 14B) to its rest state (shown in FIG. 14C) without engaging the levers 91, 92.

The latch bolt assembly 5 operates in the following way. FIG. 14A shows the latch bolt 14 in its latching position due to the magnetic attraction from the magnet 19 in the magnetic keep assembly 6. When a user desires to open the closure member 2, the user pulls the knob 8 upwards from its rest position to its actuated position thereby pulling (through the upper and lower link rods 33, 34) the puller 88 upwards from its rest position to its actuated position. By the upwards motion of the puller 88, the bevelled surface 89 engages the pin 97 thereby pushing the upper end 91*c* of the operation lever 91 in the width direction 46 in a first sense and likewise pushing the lower end 91*b* of the operation lever 91 in the width direction 46 in a second sense which is opposite to the first sense. In other words, the operation lever 91 acts as a seesaw about its central fixed pivot 93 and the puller 88 with the bevelled surface 89 acts as a sliding cam with the upper end 91*c* of the operation lever 91 being the cam follower. This pulls the latch bolt 14 into its retracted position (i.e. the latch bolt 14 undergoes a horizontal translational motion) as shown in FIG. 14B. Once the latch bolt 14 is in its retracted position, the closure member 2 is unfastened and the user may open the closure member 2 and the knob 8 may be let go. Gravity will cause the knob 8 and the puller 88 to fall downwards to their rest position as shown in FIG. 14C. However, the latch bolt 14 remains in its retracted position due to the latch bolt spring 17 and the pin 97 does not engage the bevelled surface 89. It will be readily appreciated that the inclination of the bevelled surface determines the force required to operate the puller 88. More specifically, the larger the inclination (with respect to the vertical direction 15), the more force a user will have to exert when pulling the actuator 8 upwards. However, the travel path is shorter. A smaller inclination has the opposite effect, i.e. a longer travel path with a decreased force to be exerted.

In the illustrated embodiment, the operation lever 91 acts as a first-order lever with the pin 93 forming the fixed pivot, the puller 88 being the effort and the latch bolt 14 being the load. However, in other embodiments, the operation lever 91 may pivot about its upper end (like the support lever 83) with the puller 88 engaging a central part of the operation lever. In other words, the operation lever 91 may also be a third-order lever. Alternatively, the operation lever 91 may also be a second-order lever. However, a first-order lever is preferred since this allows a flexible adaptation between force-reduction or force-magnification depending on the magnetic attraction and the desired actuation force. As such, there is no need to include the second-order lever 35 between the upper and lower link rods 33, 34 which may then be formed into a single link rod. Moreover, while the horizontal displacement of the latch bolt 14 is directly proportional to the length of the lever for a second-order of third-order lever, the first-order lever also allows varying the displacement by the angle made between the first leg 91*d* and the second leg 91*e* of the operation lever 91 additional to variations possible by the lengths of the legs 91*d*, 91*e*.

In the illustrated embodiment, the operation lever 91 and the support lever 92 also limit the horizontal motion of the latch bolt 14. More specifically, in the latching position of the latch bolt 14 (see FIG. 14A), the lower arm 91*e* of the operation lever 91 abuts against the housing 70, while, in the retracted position of the latch bolt 14 (see FIGS. 14B and 14C), the support lever 92 abuts against the housing 70.

In the illustrated embodiment, the distance between the pivot points 93, 95 of the levers 91, 92 is substantially the same as the distance between the latch bolt engagement locations 94, 96. In other words, the levers 91, 92 are connected to the latch bolt 14 at different locations along the length of the latch bolt 14. The distance between these locations is preferably as large as possible to increase stability. In order to limit the size of the housing 70 (i.e. its width), the levers 91, 92 (at least the area between the pivot points 93, 95 and the engagement points 94, 96) are bent away from one another.

Figure 17A:
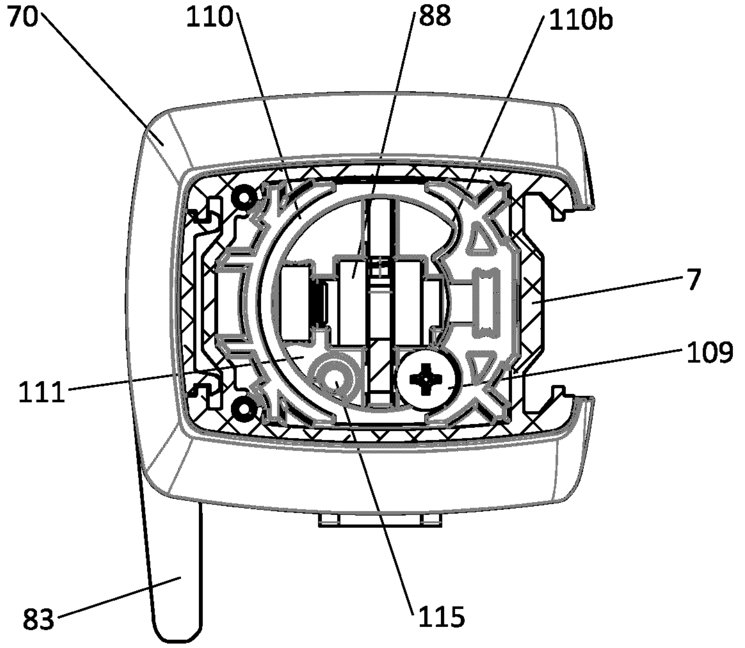
FIGS. 17A and 17B show a transverse cross-sectional view through the latch bolt assembly of FIGS. 11A and 11B.
Figure 17B:
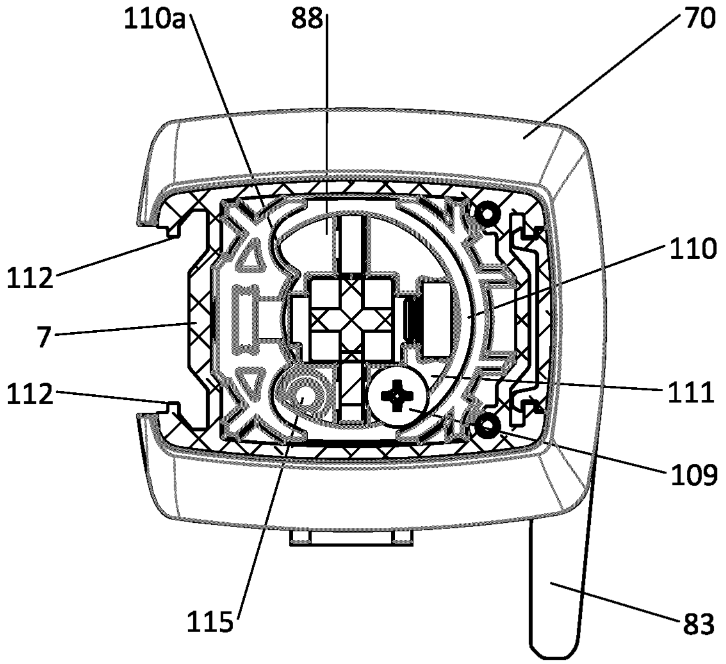
Figure 18:
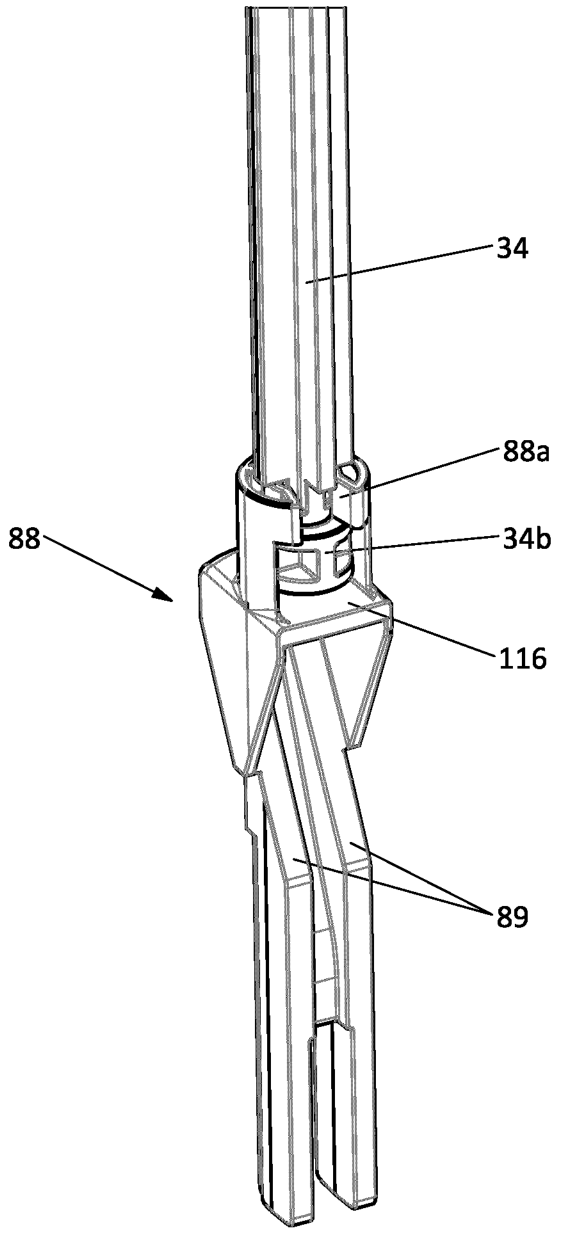
FIG. 18 shows a perspective view of the puller and part of the lower link rod of the latch bolt assembly of FIGS. 11A and 11B.

FIGS. 16 to 18 illustrate more details on the coupling between the puller 88 and the lower link rod 34 and on the coupling between the housings 7, 70. As described above, the elongated housing 70 is always fixed in the same position with respect to the closure member 2, while the lower housing 70 together with its internal components is rotatable over 180° about the vertical direction 15 with respect to the elongated housing 7. Once the housing 70 is in the correct orientation, one or more (two in the illustrated embodiment) screws 107 are screwed through the housing 7 and the housing 70 (in particular the shaft 108) as best shown in FIG. 20 thereby preventing rotation of the lower housing 70. Afterwards, the latch assembly 5 is mounted to the closure system, in particular by sliding it downwards from above the L-shaped brackets 73, 74 with the guides 76 of the brackets 73, 74 engaging the guides 77, 112 on the housings 70, 7, which guides 77, 112 are thus preferably continuous with one another.

The 180° rotation is possible without having to disconnect the housing 70 from the frame 7. More specifically, the top side 108 of the lower housing 70 forms a substantially cylindrical shaft 111 about which the elongated housing 7 is positioned. A fixation bolt 109 is fixed to the top of the shaft 108. The elongated housing 7 comprises an inner collar 110 against which the shaft 108 abuts on one side and the head of the fixation bolt 109 on the other. More specifically, the inner collar 110 has a top side 113 and a bottom side 114 (both indicated in FIG. 14C). The shaft 108 (which is part of the housing abuts against the bottom side 114 of the inner collar 110 as shown in FIG. 14C, while the fixation bolt 109 abuts against the top side 113 of the inner collar 110 as shown in FIGS. 17A and 17B. In this way, the fixation bolt 109 ensures that the housing 70 is fixed with respect to the elongated housing 7 in the vertical direction 15 thus avoiding that these elements 7, 70 are detached from one another.

As best shown in FIGS. 17A and 17B, the top of the shaft 111 is also provide with a vertical protrusion 115 adjacent the fixation bolt 109. The inner collar 110 extends over about 270° of the elongated housing 7 thus limiting the motion of the fixation bolt 109 and the vertical protrusion 115, i.e. of the lower housing 70. More specifically, in a first orientation shown in FIG. 17A, the fixation bolt 109 engages a first abutment 110*a* which forms one end of the inner collar 110, while, in second orientation shown in FIG. 17B, the vertical protrusion 115 engages a second abutment 110*b* which forms another end of the inner collar 110. Alternatively, the vertical protrusion 115 is not present and the fixation bolt 109 abuts against both ends of the inner collar 110 depending on the orientation of the housing 70. As the puller 88 rotates together with the housing 70, the puller 88 is also rotatable about the lower link rod 34 since the lower link rod 34 is fixed to the elongated housing 7. This is best shown in FIG. 18 where the top part 88*a* of the puller 88 is rotatable about the bottom part 34*b* of the lower link rod 34. An assembly opening 116 is provided in the top part 88*a* of the puller 88 to allow assembly of the lower link rod 34 and the puller 88.

The magnet 19 in the magnet latch assembly 1' is identical to that in the magnet latch assembly 1 and similar forces are exerted on the latch bolt 14 with similar forces being required in order to lift the knob 8.

It will be readily appreciated that various modifications are possible in which the advantages of the second-order lever between the link rods 33, 34 and/or of the locking mechanism and/or the low-friction latch bolt 14 and/or the height adjustment mechanism and/or the left-right reversibility are also obtained. For example, in an embodiment, the magnetic roles of the latch bolt 14 and the magnet 19 are reversed. In other words, the latch bolt 14 is a permanent magnet and element 19 is made from a ferromagnetic material (e.g. iron). The operation of the magnetic latch assembly 1 remains unaffected because the latch bolt 14 will still be attracted to the element 19 as this is fixedly positioned within the keeper assembly 6. Moreover, it is also possible that the latch bolt 14 and the magnet 19 are permanent magnets and/or electromagnets. Moreover, the position of the latch bolt assembly 5 and the keeper assembly 6 may also be reversed, i.e. the latch bolt assembly 5 may be mounted on the closure member 2 and the keeper assembly 6 on the support 4.

In both magnetic latches 1, 1', the latch bolt 14 and the magnet 19 are oriented in such a way that the attraction force is in the same orientation as the unlocking movement. More specifically, in the magnetic latch 1, the latch bolt 14 is vertically attracted to the magnet 19 and is unfastened by moving the latch bolt 14 upwards in the vertical direction. While, in the magnetic latch 1', the latch bolt 14 is horizontally attracted to the magnet 19 and is unfastened by moving the latch bolt 14 away in the horizontal direction.

Figure 21A:
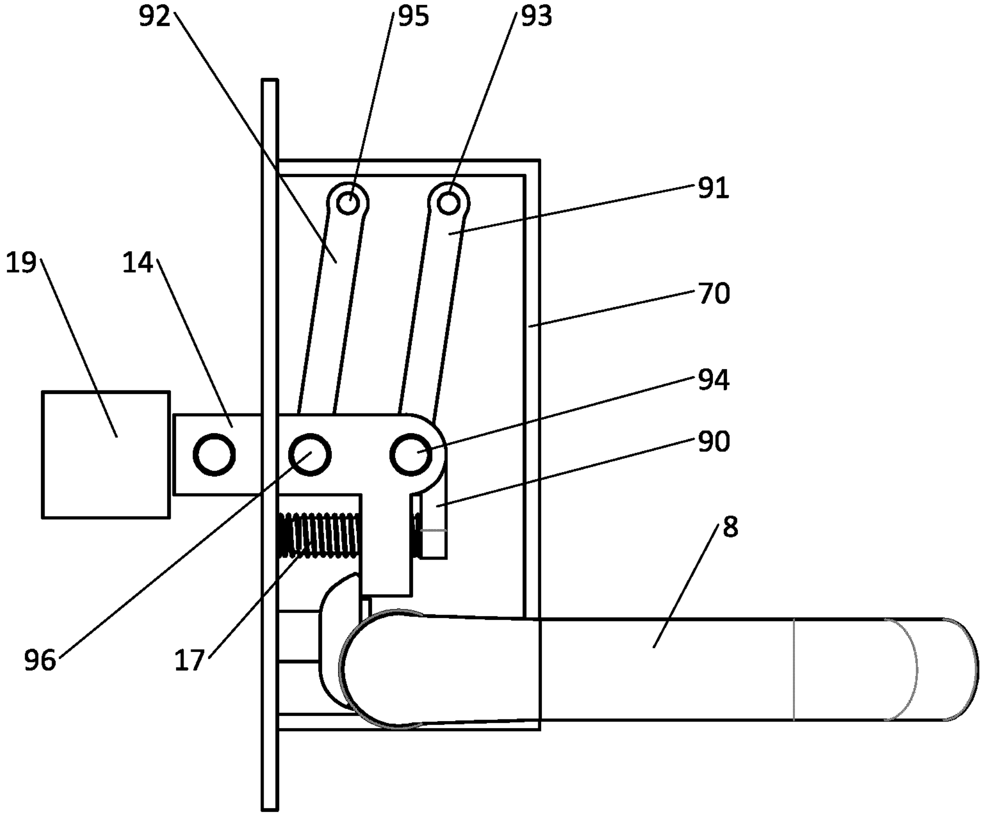
FIGS. 21A to 21C show a longitudinal cross-section through a magnetic latch assembly in its latching, unlatched, and rest position.
Figure 21B:
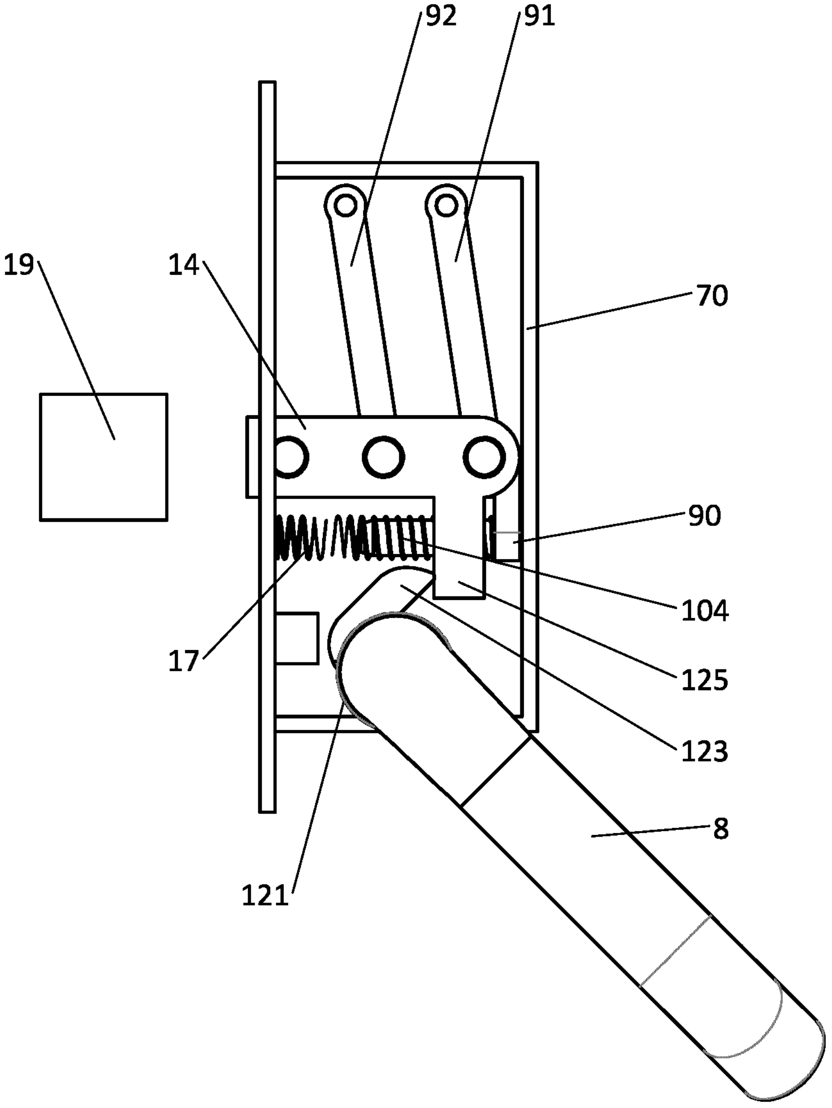
Figure 21C:
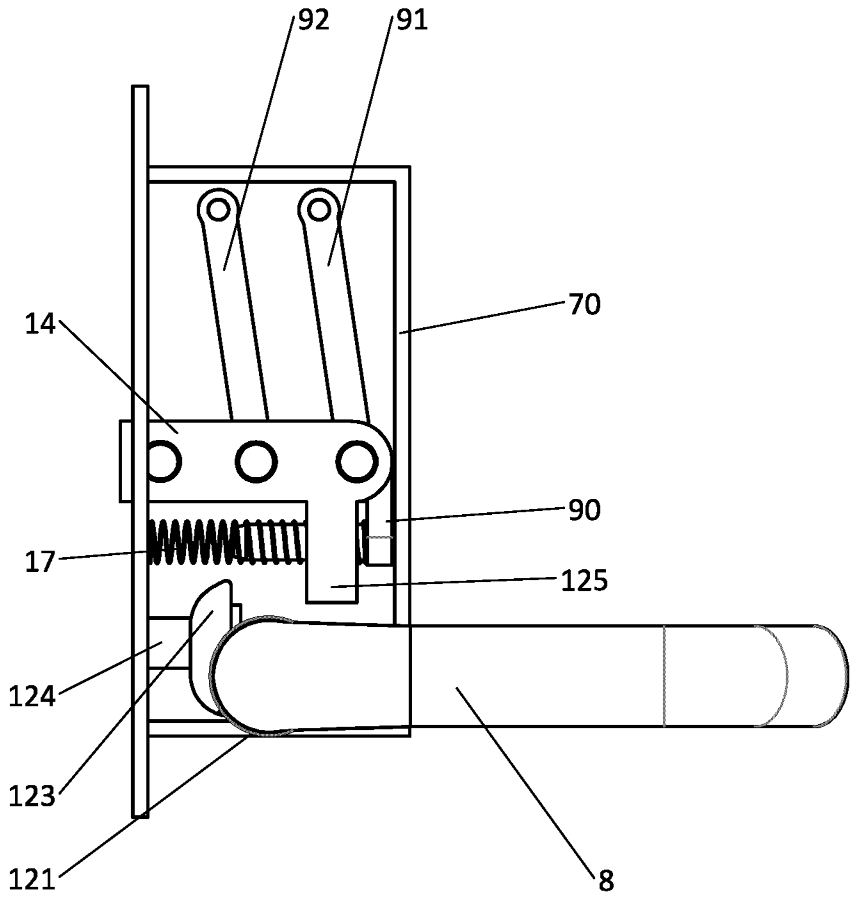

It will be readily appreciated that the low-friction latch bolt 14 (i.e. the latch bolt 14 mounted to the housing 70 by means of two levers 91, 92) may also be used in less complex magnetic latch assemblies. An example of such a magnetic latch bolt assembly embodiment is illustrated in FIGS. 21A to 21C. The magnetic latch bolt assembly comprises a housing 70 in which a latch bolt 14 is suspended by means of two levers 91, 92. More specifically, the levers 91, 92 are pivotally connected to the frame by transverse pins 93, 95 and to the latch bolt 14 by transverse pins 94, 96. A latch bolt spring 17 (i.e. a compression spring) is disposed between the housing 70 and a protrusion 90 of the latch bolt 14. A guiding pin 104 is provided for preventing buckling of the latch bolt spring 17. The latch bolt spring 17 urges the latch bolt 14 towards its unlatching position (shown in FIG. 21C). The latch bolt assembly further comprises a follower 121 designed to cooperate with a spindle (not shown) which is connected to a door handle 8 or the like, i.e. an actuator. The follower 121 includes a rotary driving bit 123 which engages the latch bolt 14, in particular a protrusion 125 thereon. A biasing member (not shown), in particular a torsion spring, biases the follower 121 towards its rest position shown in FIG. 21C where the rotary driving bit 123 engages a stop 124 provided on the frame 70, although other means are known to limit movement of the follower 121.

In the rest position of the magnetic latch bolt assembly (shown in FIG. 21C), the latch bolt 14 is retracted due to the latch bolt spring 17. The door handle 8 (i.e. the actuator) cannot engage the latch bolt 14. When the closure member on which the magnetic latch bolt assembly is mounted is closed, the latch bolt 14 is attracted by magnet 19 towards its projecting position (shown in FIG. 21A). The roles of the magnetic elements 14, 19 may naturally be reversed. Once the magnetic latch bolt assembly is latched, actuating the door handle 8 (i.e. the actuator) causes the follower 121 to rotate in turn moving (i.e. swinging) the latch bolt 14 against the magnetic attraction towards its retracted position shown in FIG. 21B. It will be readily appreciated that other kinds of actuators may be used instead of the door handle. For example, the actuator may also be in the form of a push-bar or panic-bar.

A main advantage of this kind of magnetic latch assembly is that there is no need to have a latch bolt with an inclined front surface which, when closing a closure member into which or on which the latch bolt assembly is mounted, cooperates with a striker (not shown) to move the latch bolt 14 to the retracted position. In order for such inclined surfaces to properly operate, the closure member has to close with a sufficiently large force. In the present embodiment, this is no longer required as the rest position of the latch bolt is the retracted position thus always allowing the closure member to be closed even with a minimal closing speed.

This latch bolt assembly also illustrates that the levers 91, 92 are not necessarily part of the latch bolt operating mechanism. In other words, the levers 91, 92 may be used solely for suspending the latch bolt, while the operating mechanism is distinct therefrom. As such, the operation lever 91 in the magnetic latch 1', in a non-illustrated embodiment, does not necessarily form part of the latch bolt operating mechanism and a different construction is possible where the puller 88 directly or indirectly engages the latch bolt 14 without required in the operation lever 91.

Although aspects of the present disclosure have been described with respect to specific embodiments, it will be readily appreciated that these aspects may be implemented in other forms within the scope of the invention as defined by the claims.

The invention claimed is:

1. A magnetic latch for fastening a closure member to a support, the support extending in a first direction, the magnetic latch comprising a latch assembly configured to be mounted to one of the closure member and the support the magnetic latch and latch assembly comprising:

a frame;

a latch bolt mounted on the frame and being moveable between a latching position and a retracted position along a second direction which is substantially perpendicular to the first direction; and a latch bolt operating mechanism including an actuator mounted on the frame and configured to, upon actuation of the actuator, move the latch bolt from its latching position to its retracted position, the magnetic latch further comprising a keeper assembly configured to be mounted to the other one of the closure member and the support, the keeper assembly comprising a first magnetic element and the latch bolt comprising a second magnetic element, wherein the first magnetic element and the second magnetic element are configured to magnetically attract each other to move the latch bolt along a second direction into its latching position, characterized in that the latch assembly further comprises a first lever and a second lever, each lever being pivotally connected to the frame with a pivot axis which extends in a third direction which is substantially perpendicular to the first direction and to the second direction, the latch bolt being suspended from the levers with the latch bolt being swingable between its latching position and its retracted position, each lever being moveable between a first position which corresponds to the latching position of the latch bolt and a second position which corresponds to the retracted position of the latch bolt.

2. The magnetic latch according to claim 1, characterized in that each lever is pivotally connected to the latch bolt.

3. The magnetic latch according to claim 1, characterized in that the first lever is connected to the latch bolt at a first location and the second lever is connected to the frame at a second location, the first and second location being separated by a first distance in the horizontal direction.

4. The magnetic latch according to claim 3, characterized in that the first lever is connected to the frame at a first pivot point and the second lever is connected to the latch bolt at a second pivot point, the first and the second pivot point being separated by a second distance in the horizontal direction, which second distance is substantially similar to the first distance.

5. The magnetic latch according to claim 1, characterized in that the latch bolt operating mechanism comprises a sliding cam and said first lever which forms a cam follower, the sliding cam being moveable by a translational motion in a vertical direction from a first position to a second position thereby moving the first lever from its first position to its second position.

6. The magnetic latch according to claim 5, characterized in that the sliding cam has a cam surface having an inclination of at most 45° with respect to the vertical direction.

7. The magnetic latch according to claim 5, characterized in that the first lever is a first order lever with its pivotal connection to the frame being located between its connection to the latch bolt and its engagement with the sliding cam.

8. The magnetic latch according to claim 5, characterized in that the first lever moves over an angle between its first and its second position, said angle being between 5° and 45°, preferably between 10° and 30°, more preferably between 13° and 25°, and most preferably between 15° and 20°.

9. The magnetic latch according to claim 1, characterized in that the latch bolt operating mechanism comprises a spindle connected to the actuator and a follower fixedly disposed on the spindle, the follower having a rotary driving bit which engages the latch bolt to move the latch bolt from its latching position to its retracted position.

10. The magnetic latch according to claim 1, characterized in that the latch bolt has a non-circular cross-section and is at least partially positioned within a corresponding non-circular opening in the frame.

11. The magnetic latch according to claim 1, characterized in that the latch bolt, when in its latching position, extends inside the frame over at least 40% of its length and has two side surfaces which oppose one another, the frame having internal walls adjacent to the side surfaces of the latch bolt for at least the area where the latch bolt extends inside the frame in its latching position.

12. The magnetic latch according to claim 1, characterized in that the latch bolt moves along a curve between its latching position and its retracted position, said curve being symmetrical with respect to the position central between the latching position and the retracted position and/or said curve having a radius of curvature between 1 cm and 20 cm, preferably between 2 cm and 15 cm, more preferably between 3 cm and 10 cm, and most preferably between 4 cm and 7 cm.

13. The magnetic latch according to claim 1, characterized in that the latch assembly further comprises a latch bolt biasing member arranged to urge the latch bolt into either its retracted position or its latching position.

14. The magnetic latch according to claim 1, characterized in that the latch bolt comprises a first and a second protective cover plate to cover the second magnetic element, the protective cover plates being disposed on opposing sides of the latch bolt in a further horizontal direction which is perpendicular to the horizontal direction.

* * * * *